United States Patent
Santo et al.

(10) Patent No.: US 7,605,516 B2
(45) Date of Patent: Oct. 20, 2009

(54) MOTOR, COMMUTATOR, SHORT-CIRCUIT MEMBER, AND A METHOD FOR MANUFACTURING THE COMMUTATOR

(75) Inventors: Shinji Santo, Kosai (JP); Masayuki Kuwano, Kosai (JP); Toshio Yamamoto, Kosai (JP); Yoshiki Nakano, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 514 days.

(21) Appl. No.: 11/554,413

(22) Filed: Oct. 30, 2006

(65) Prior Publication Data

US 2007/0152531 A1    Jul. 5, 2007

(30) Foreign Application Priority Data

Oct. 31, 2005 (JP) ............................ 2005-317461
Oct. 31, 2005 (JP) ............................ 2005-317462

(51) Int. Cl.
   *H01R 39/04* (2006.01)
(52) U.S. Cl. ........................................... 310/233
(58) Field of Classification Search ................. 310/233, 310/234, 231
   See application file for complete search history.

(56) References Cited

U.S. PATENT DOCUMENTS 5,473,212 A * 12/1995 Crook et al. ................ 310/221
5,796,203 A * 8/1998 Wang ........................ 310/233
6,285,109 B1 * 9/2001 Katagiri et al. ............. 310/269
6,731,041 B2 * 5/2004 Furuya et al. ............... 310/234
2005/0264126 A1 * 12/2005 Lee .......................... 310/234

FOREIGN PATENT DOCUMENTS

JP    2005-005293    1/2005
JP    2005-137193    5/2005

* cited by examiner

*Primary Examiner*—Hanh N. Nguyen
(74) *Attorney, Agent, or Firm*—Marsh Fischmann & Breyfogle LLP

(57) ABSTRACT

A commutator connected to armature coils includes circumferentially arranged segments, short-circuit conductors, and a surge absorbing element. The number of the segments is a multiple of the number of the armature coils. The segments include a plurality of pairs of segments. The segments in each pair are adjacent to each other in the circumferential direction. Each segment in each pair is connected to one of the ends of corresponding one of the armature coils. The number of the short-circuit conductors is the same as the number of the armature coils. Each short-circuit conductor short-circuits segments that are at the same potential to each other. Each short-circuit conductor is connected, either directly or via corresponding one of the segments, to the surge absorbing element, so that the surge absorbing element is electrically interposed between the ends of each armature coil.

12 Claims, 20 Drawing Sheets

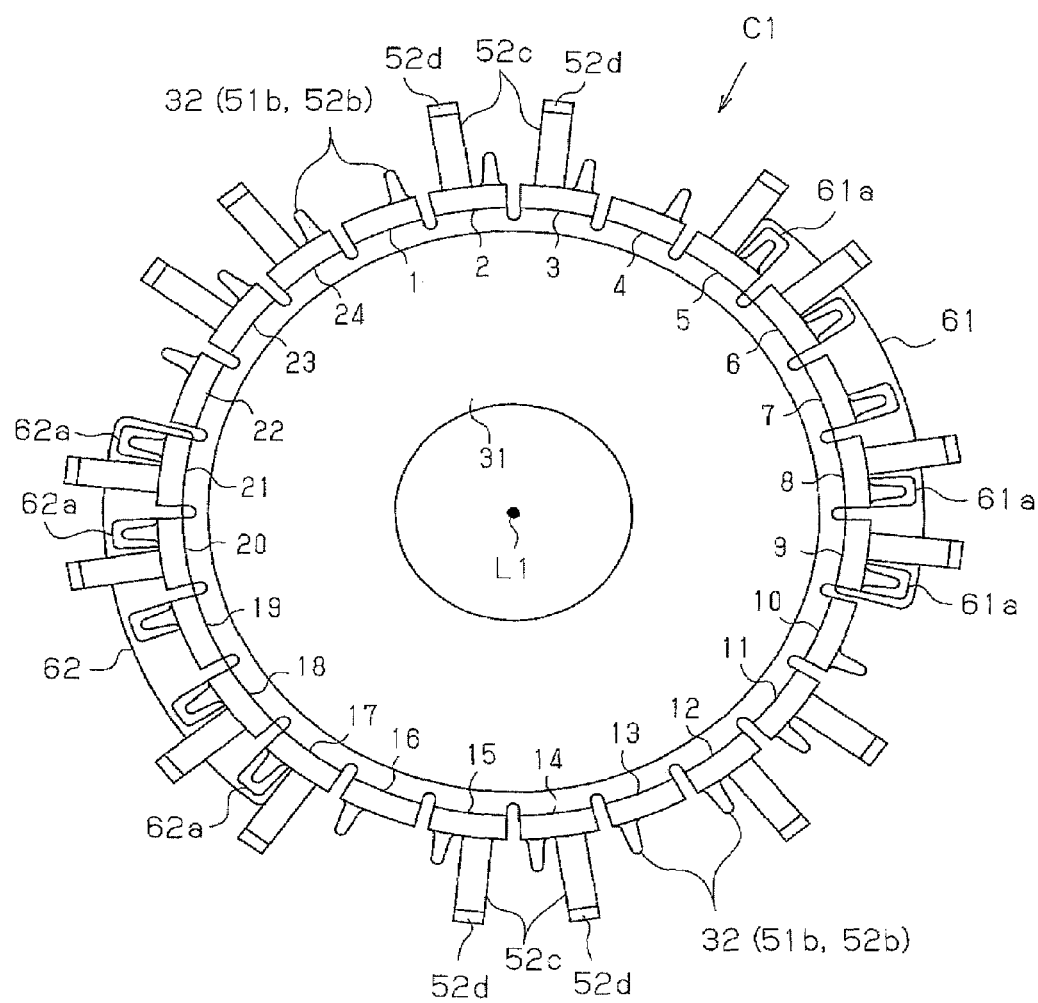

MOTOR, COMMUTATOR, SHORT-CIRCUIT MEMBER, AND A METHOD FOR MANUFACTURING THE COMMUTATOR

BACKGROUND OF THE INVENTION

The present invention relates to a motor, a commutator provided in the motor, a short-circuit member provided in the commutator, and a method for manufacturing the commutator.

When a motor in which electric current is supplied through brushes that slide on segments of a commutator is driven, spark discharge can occur between the commutator and the brushes. Spark discharge is one of the factors that shorten the life of the brushes. Thus, some prior art motors include a varistor, or a surge absorbing element, to prevent spark discharge. The varistor is electrically interposed between the ends of each armature coil, which is part of the motor.

For example, Japanese Laid-Open Patent Publication No. 2005-5293 discloses a motor, in which a varistor is fixed to a commutator. The commutator includes a cylindrical insulator press fitted about the rotary shaft of the motor and three segments fixed to the outer circumferential surface of the insulator. Each of the three segments is connected to an end of one of the armature coils of the motor. Brushes for supplying currents to the armature coils slide on the segments. A riser extends outward in the radial direction from one end of each segment in the longitudinal direction. An annular varistor is located on the risers. A contact piece formed at the distal end of each riser is bent, so that the varistor is tightly held between the risers and the contact pieces. This electrically connects the varistor with the segments, and the varistor is located between the ends of each armature coil.

The structure in which a varistor is interposed between the ends of each armature coil can be applied to multipolar motor such as the motor disclosed in Japanese Laid-Open Patent Publication No. 2005-137193. The motor disclosed in the publication has segments the number of which is the number of the armature coils multiplied by an integer greater than one. The ends of each armature coil are connected to a predetermined adjacent pair of the segments. The publication discloses as one example a motor having six permanent magnet and eight armature coils. Among twenty-four segments of the motor, segments of the same potential are short-circuited, and thus the number of the brushes is two.

However, when applying the structure in which a varistor is electrically interposed between the ends of each armature coil is applied to the motor disclosed in Japanese Laid-Open Patent Publication No. 2005-137193, a connection portions is needed between each end of the armature coils and the varistor (that is, between the varistor and each segment to which one of the ends of the armature coils is connected), and the number of the required connection portions corresponds to the number of the ends of the armature coils, that is, the number of the coils multiplied by two. For example, when the number of the coils is eight, sixteen connection portions are required between the ends of the armature coils and the varistor. In the case of a multipolar motor having a greater number of armature coils, the number of the connection portions increases, accordingly. This complicates the manufacturing procedure of the commutator.

The motor disclosed in Japanese Laid-Open Patent Publication No. 2005-137193 has more poles than the motor disclosed in Japanese Laid-Open Patent Publication No. 2005-5293. Thus, the motor of the publication number 2005-137193 has a greater number of contact pieces for holding the varistor with the risers than the number of contact pieces of the motor of the publication number 2005-5293. The greater the number of the contact pieces, the more complicated the process for attaching a varistor to the commutator by bending the contact pieces becomes.

As shown above, an increase in the number of connection portions and contact pieces is likely to reduce the productivity of commutators.

SUMMARY OF THE INVENTION

An objective of the present invention is to provide a commutator having a surge absorbing element, which commutator has an improved productivity. Another objective of the present invention is to provide a motor provided with the commutator, a short-circuit member used in the commutator, and a method for manufacturing the commutator.

In accordance with a first aspect of the present invention, a commutator connected to a plurality of armature coils is provided. The commutator includes circumferentially arranged segments, short-circuit conductors, and a surge absorbing element. The number of the segments is a multiple of the number of the armature coils. The segments include a plurality of pairs of segments. The segments in each pair are adjacent to each other in the circumferential direction. Each segment in each pair is connected to one of the ends of corresponding one of the armature coils. The number of the short-circuit conductors is the same as the number of the armature coils. Each short-circuit conductor short-circuits segments that are at the same potential to each other. The resistance of the surge absorbing element varies so as to reduce spark discharge generated between the segments and an electricity supply brush sliding on the segments. Each short-circuit conductor is connected, either directly or via corresponding one of the segments, to the surge absorbing element, so that the surge absorbing element is electrically interposed between the ends of each armature coil.

In accordance with a second aspect of the present embodiment, a motor including a stator, an electricity supplying brush for supplying electricity, and an armature rotatably arranged inside of the stator is provided. The stator has a plurality of circumferentially arranged permanent magnets. The armature includes a plurality of armature coils and a commutator. The commutator includes circumferentially arranged segments, short-circuit conductors, and a surge absorbing element. The number of the segments is a multiple of the number of the armature coils. The segments include a plurality of pairs of segments. The segments in each pair are adjacent to each other in the circumferential direction. Each segment in each pair is connected to one of the ends of corresponding one of the armature coils. The number of the short-circuit conductors is the same as the number of the armature coils. Each short-circuit conductor short-circuiting segments that are at the same potential to each other. The resistance of the surge absorbing element varies so as to reduce spark discharge generated between the segments and the electricity supply brush. Each short-circuit conductor is connected, either directly or via corresponding one of the segments, to the surge absorbing element, so that the surge absorbing element is electrically interposed between the ends of each armature coil.

In accordance with a third aspect of the present invention, a commutator including a commutator main body, a short-circuit member, and a surge absorbing element is provided. The commutator main body has a plurality of circumferentially arranged segments. The short-circuit member includes two short-circuit components. Each short-circuit component has a set of outer terminals, a set of inner terminals, and a set of coupling portions. Each outer terminal in each set of the outer terminals is connected to corresponding one of the segments. The set of the outer terminals and the set of the inner terminals of each short-circuit component are concentrically arranged. Each outer terminal of each short-circuit component is coupled to one of the inner terminals that is displaced by a predetermined angular interval of the same short-circuit component via corresponding one of the coupling portions of the same short-circuit component. The short-circuit components are laminated such that the coupling portions of one short-circuit component and the coupling portions of the other short-circuit component extend in an intersecting manner, such that the sets of the outer terminals of the two short-circuit components establish surface contact with each other, and the sets of the inner terminals of the two short-circuit components establish surface contact with each other, while the sets of the coupling portions of the two short-circuit components do not contact each other. The resistance of the surge absorbing element varies so as to reduce spark discharge generated between the segments and an electricity supply brush sliding on the segments. The surge absorbing element is integrally molded with circumferentially adjacent pairs of the outer terminals or with circumferentially adjacent pairs of the inner terminals to be located between the adjacent terminals, thereby electrically connecting the adjacent terminals.

In accordance with a fourth aspect of the present invention, a short-circuit member including two short-circuit components is provided. Each short-circuit component has a set of outer terminals, a set of inner terminals, and a set of coupling portions. Each outer terminal in each set of the outer terminals is connected to corresponding one of a plurality of segments of the commutator. The set of the outer terminals and the set of the inner terminals of each short-circuit component are concentrically arranged. Each outer terminal of each short-circuit component is coupled to one of the inner terminals that is displaced by a predetermined angular interval of the same short-circuit component via corresponding one of the coupling portions of the same short-circuit component. The short-circuit components are laminated such that the coupling portions of one short-circuit component and the coupling portions of the other short-circuit component extend in an intersecting manner, such that the sets of the outer terminals of the two short-circuit components establish surface contact with each other, and the sets of the inner terminals of the two short-circuit components establish surface contact with each other, while the sets of the coupling portions of the two short-circuit components do not contact each other. A surge absorbing element is integrally molded with circumferentially adjacent pairs of the outer terminals or with circumferentially adjacent pairs of the inner terminals to be located between the adjacent terminals, thereby electrically connecting the adjacent terminals. The resistance of the surge absorbing element varies so as to reduce spark discharge generated between the segments and an electricity supply brush sliding on the segments.

In accordance with a fifth aspect of the present invention, a method for manufacturing a commutator is provided. The commutator includes a commutator main body, a short-circuit member, and a surge absorbing element. The commutator main body has a plurality of circumferentially arranged segments. The short-circuit member includes two short-circuit components. Each short-circuit component has a set of outer terminals, a set of inner terminals, and a set of coupling portions. Each outer terminal in each set of the outer terminals is connected to corresponding one of the segments. The set of the outer terminals and the set of the inner terminals of each short-circuit component are concentrically arranged. Each outer terminal of each short-circuit component is coupled to one of the inner terminals that is displaced by a predetermined angular interval of the same short-circuit component via corresponding one of the coupling portions of the same short-circuit component. The short-circuit components are laminated such that the coupling portions of one short-circuit component and the coupling portions of the other short-circuit component extend in an intersecting manner, such that the sets of the outer terminals of the two short-circuit components establish surface contact with each other, and the sets of the inner terminals of the two short-circuit components establish surface contact with each other, while the sets of the coupling portions of the two short-circuit components do not contact each other. The resistance of the surge absorbing element varies so as to reduce spark discharge generated between the segments and an electricity supply brush sliding on the segments. The method includes: providing a powder material of the surge absorbing element between circumferentially adjacent pairs of the outer terminals or between circumferentially adjacent pairs of the inner terminals of laminated short circuit components; and pressing and heating the powder material provided between the adjacent outer terminals or between the adjacent inner terminals, thereby forming the surge absorbing element that electrically connects the adjacent outer terminals to each other or the adjacent inner terminals to each other.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a plan view of a commutator of the motor shown in FIG. 1;

DETAILED DESCRIPTION OF THE PREFERRED EMBODIMENTS

A first embodiment of the present invention will now be described with reference to FIGS. 1 to 6.

Figure 1:
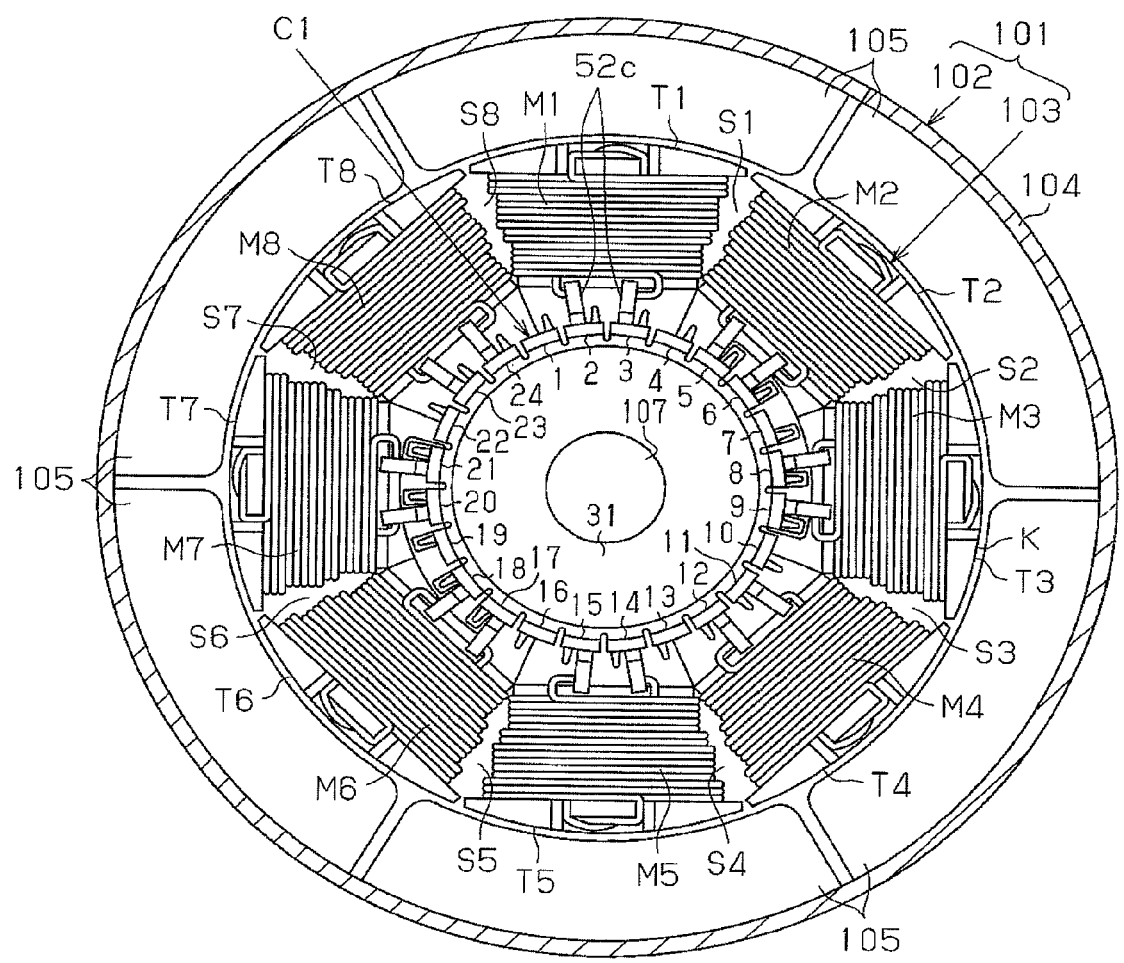
FIG. 1 is a radial cross-sectional view illustrating a motor according to a first embodiment of the present invention.
Figure 2:
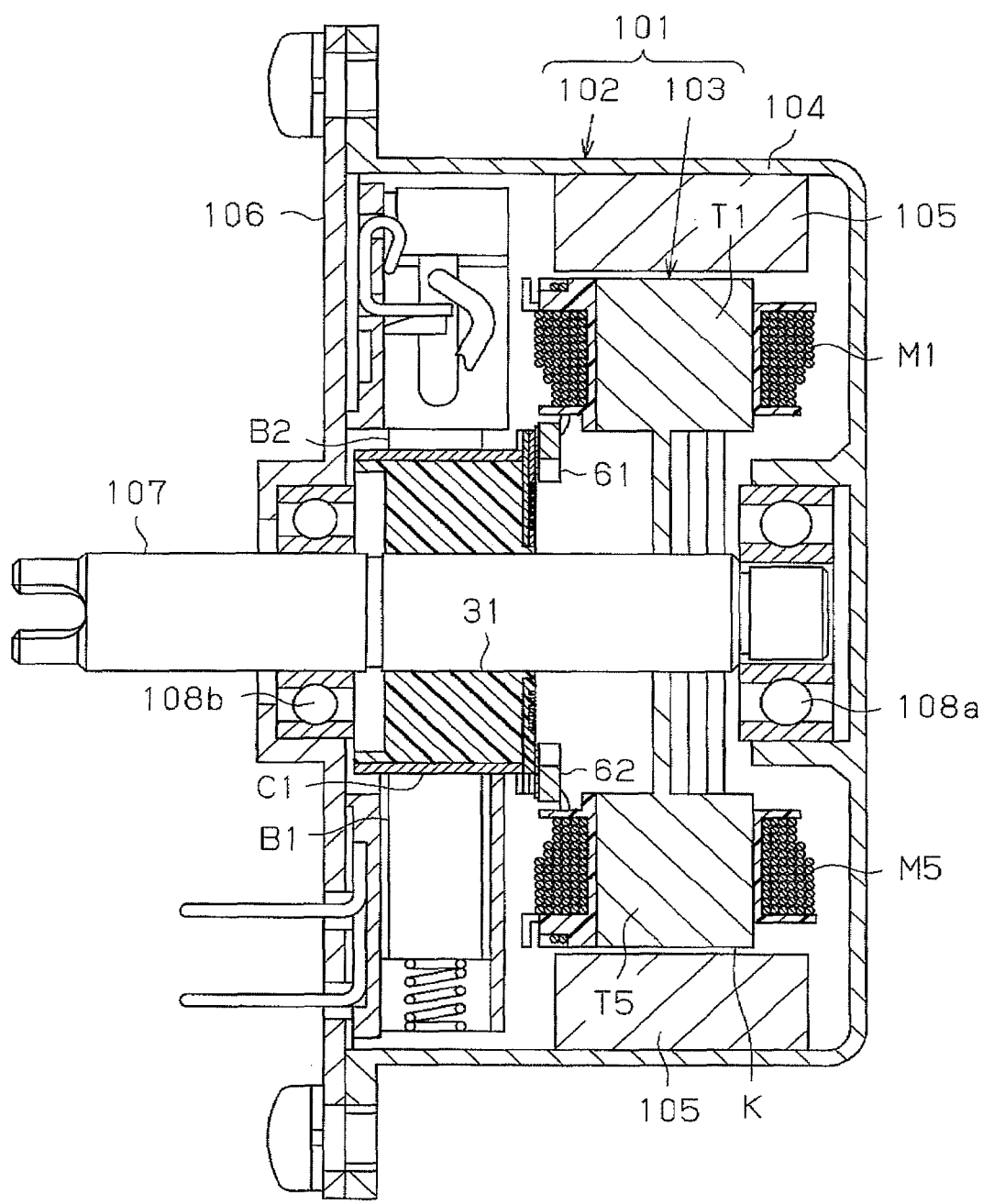
FIG. 2 is an axial cross-sectional view of the motor shown in FIG. 1.

FIG. 1 is a radial cross-sectional view illustrating a motor 101 according to the present embodiment, and FIG. 2 is an axial cross-sectional view of the motor 101. As shown in FIGS. 1 and 2, the motor 101 includes a stator 102 and an armature 103 located inside of the stator 102. A yoke housing 104 forming the stator 102 is formed as a cylinder with a bottom and has six permanent magnets 105 fixed to the inner circumferential surface. The permanent magnets 105 are arranged at equal angular intervals along the circumferential direction of the yoke housing 104. The number of poles P formed by the six permanent magnets 105 is six. The opening of the yoke housing 104 is closed by a substantially disk-shaped end frame 106. The end frame 106 supports an anode brush B1 and a cathode brush B2, which function as electricity supplying brushes, connected to an external power supply.

The armature 103 is located inside of the six permanent magnets 105. A rotary shaft 107 of the armature 103 is rotatably supported by bearings 108a, 108b that are fixed to a center of the bottom of the yoke housing 104 and a center of the end frame 106, respectively. An end of the rotary shaft 107 extends from the center of the end frame 106 toward the outside of the yoke housing 104.

An armature core K is fixed to the rotary shaft 107. The armature core K is arranged to face the permanent magnets 105 in the radial direction. As shown in FIG. 1, the armature core K includes eight teeth T1 to T8 that extend in the radial direction of the rotary shaft 107. Eight slots S1 to S8 are each defined between an adjacent pairs of teeth T1 to T8 in the circumferential direction of the rotary shaft 107. The motor 101 of the present embodiment has eight coils M1 to M8. Hereafter, the number of the coils is represented by a symbol C. The coils M1 to M8 are wound by means of concentrated winding about the teeth T1 to T8, respectively, such that each of the coils M1 to M8 passes through the corresponding two of the slots S1 to S8.

As shown in FIG. 2, a commutator C1 is fixed to a portion of the rotary shaft 107 located between the end frame 106 and the armature core K. The commutator C1 is connected to ends of the coils M1 to M8. The commutator C1 has a cylindrical insulator 31 that is press fitted about the rotary shaft 107. As shown in FIG. 3, a plurality of reed-shaped segments 1 to 24 (the number of which is twenty-four in the present embodiment) are provided on the outer circumferential surface of the insulator 31. The segments 1 to 24 are arranged at equal angular intervals along the circumferential direction of the insulator 31. A space exists between each circumferentially adjacent pair of the segments 1 to 24. The anode brush B1 and the cathode brush B2 slide on the segments 1 to 24 (see FIG. 2) from the radially outside.

Figure 4A:
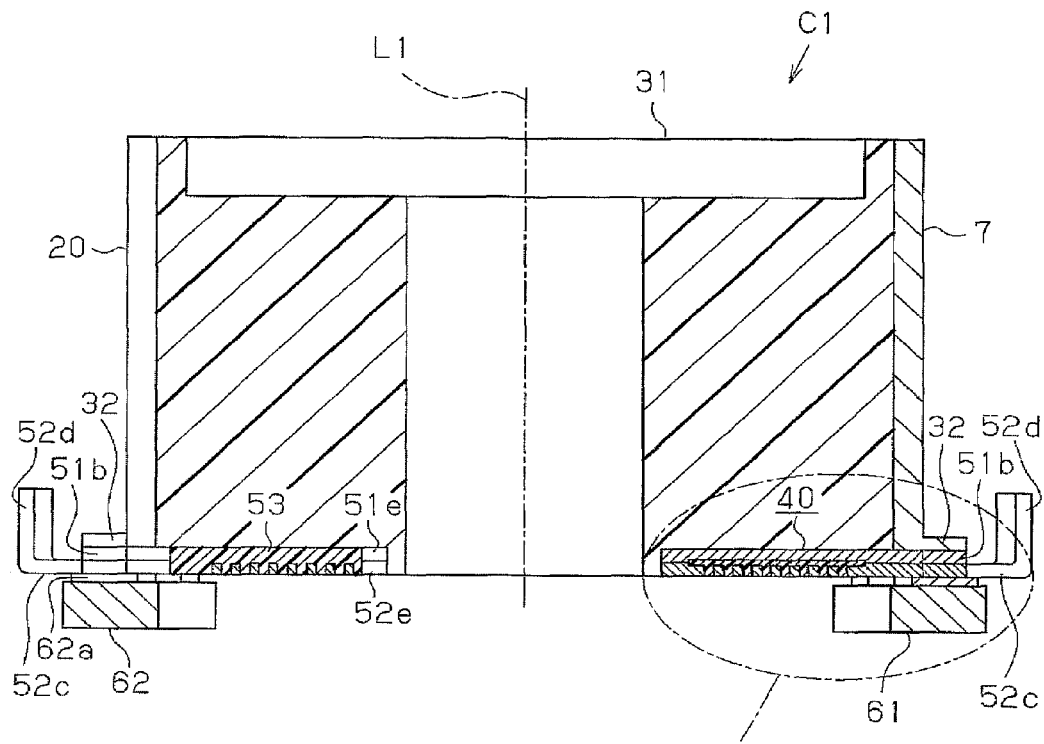
FIG. 4A is an axial cross-sectional view of the commutator shown in FIG. 3 (cross-sectional view taken along line A1-A1 of FIG. 5)

As shown in FIGS. 3 and 4A, each of the segments 1 to 24 has a main body projection 32 at one end in the axial direction of the insulator 31 (lower end as viewed in FIG. 4A). Each main body projection 32 projects outward in the radial direction of the insulator 31 from one of the segments 1 to 24. The main body projections 32 function to connect a short-circuit member 40, which will be discussed below, to the segments 1 to 24. Each main body projection 32 is located at one end of the corresponding one of the segments 1 to 24 in the circumferential direction of the insulator 31 (on a leading side in the clockwise direction as viewed in FIG. 3).

Figure 4B:
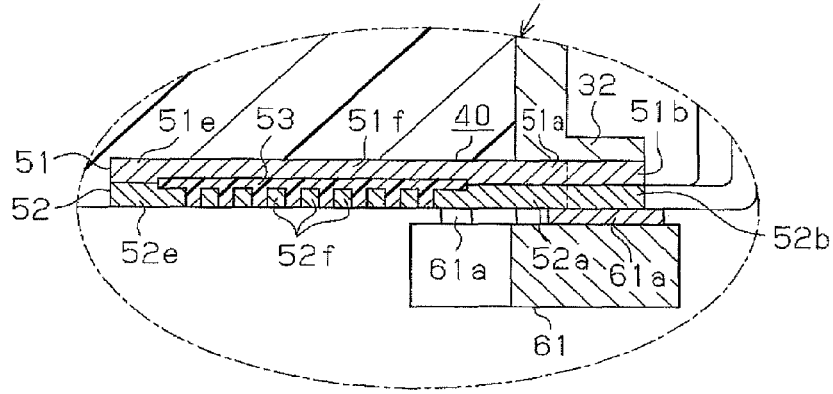
FIG. 4B is a partially enlarged view of FIG. 4A.
Figure 5:
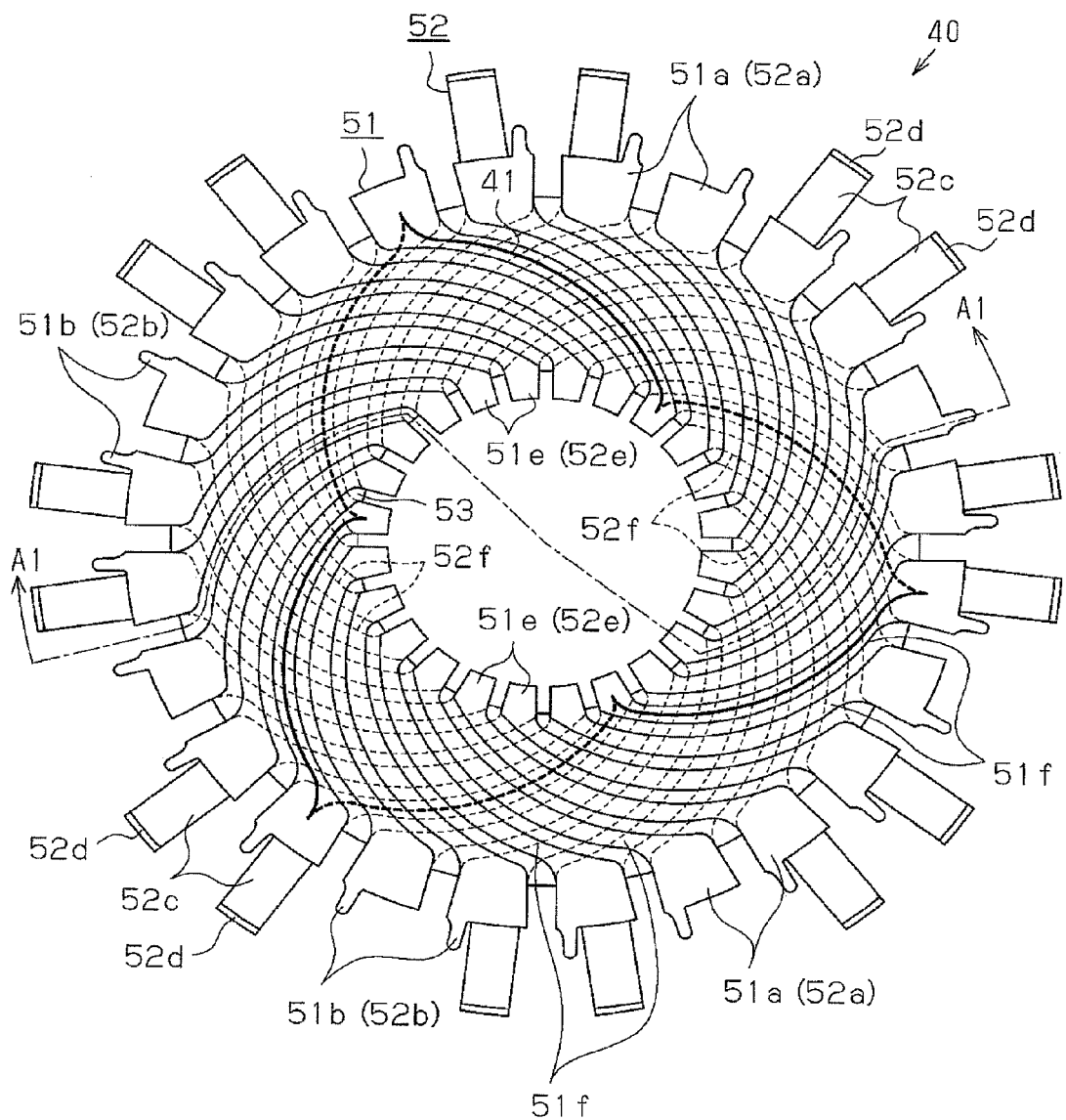
FIG. 5 is a plan view of a short-circuit member of the motor shown in FIG. 1.

As shown in FIGS. 4A and 4B, the short-circuit member 40 is located on an end surface of the insulator 31 facing the armature core K (see FIG. 2). The short-circuit member 40 forms eight short-circuit conductors 41 to 48 (see FIG. 6). Each of the short-circuit conductors 41 to 48 short-circuits segments 1 to 24 that are at the same potential to each other. The short-circuit member 40 is formed by two short-circuit components 51, 52 and an insulating member 53. The short-circuit components 51, 52 are formed by punching conductive material and have the same shape. As shown in FIG. 5, each short-circuit component 51 includes substantially rectangular outer terminals 51a, which are arranged along the circumferential direction of the insulator 31. Likewise, each short-circuit component 52 includes substantially rectangular outer terminals 52a, which are arranged along the circumferential direction of the insulator 31. The number of each set of the terminals 51a, 52a is the same as the number of the segments, and is twenty-four in this embodiment. The circumferential width of each outer terminal 51a, 52a is slightly less than the circumferential width of each segment 1 to 24. A projection 51b projecting radially outward is formed at one of the circumferential ends of each outer terminal 51a (on the leading side in the clockwise direction as viewed in FIG. 5). A projection 52b projecting radially outward is formed at one of the circumferential ends of each outer terminal 52a (on the leading side in the clockwise direction as viewed in FIG. 5). When viewed along the axial direction of the insulator 31, the projections 51b, 52b have the same shape as that of the main body projections 32 (see FIG. 3).

Sixteen of the twenty-four outer terminals 52a, that is, the outer terminals 52a except eight of them that are located at equal angular intervals along the circumferential direction of the insulator 31 each have a connection claw 52c at one end in the circumferential direction (the end in the counterclockwise direction as viewed in FIG. 5). Each connection claw 52c has a bent piece 52d at the distal end, which is parallel to the axial direction of the insulator 31 before the coils M1 to M8 are wound.

Inside of the outer terminals 51a, substantially rectangular inner terminals 51e, which are smaller than the outer terminals 51a, are arranged in the circumferential direction of the insulator 31. The number of the inner terminals 51e is equal to that of the segments (twenty-four in this embodiment). Each outer terminal 51a is at the same circumferential position with one of the inner terminals 51e. That is, radially extending centerlines of one of the outer terminals 51a and the corresponding inner terminal 51e, which face each other in the radial direction of the insulator 31, are aligned. Each outer terminal 51a is coupled to the corresponding one of the inner terminals 51e, which is displaced by a predetermined angle, by a coupling portion 51f that is formed along an involute curve. In this embodiment, the predetermined angle is sixty degrees, which corresponds to an angle containing four of the inner terminals 51e. The outer terminals 51a, the inner terminals 51e, and the coupling portions 51f are substantially located in a common plane.

Likewise, inside of the outer terminals 52a, substantially rectangular inner terminals 52e, which are smaller than the outer terminals 52a, are arranged in the circumferential direction of the insulator 31. The number of the inner terminals 52e is equal to that of the segments (twenty-four in this embodiment). Each outer terminal 52a is at the same circumferential position with one of the inner terminals 52e. That is, radially extending centerlines of one of the outer terminals 52a and the corresponding inner terminal 52e, which face each other in the radial direction of the insulator 31, are aligned. Each outer terminal 52a is coupled to the corresponding one of the inner terminal 52e, which is displaced by a predetermined angle, by a coupling portion 52f that is formed along an involute curve. In this embodiment, the predetermined angle is sixty degrees, which corresponds to an angle containing four of the inner terminals 52e. The outer terminals 52a, the inner terminals 52e, and the coupling portions 52f are substantially located in a common plane.

The short-circuit components 51, 52 constructed as described above are laminated in such a manner that the coupling portions 51f, 52f are displaced in opposite directions as viewed in the axial direction of the insulator 31, such that the coupling portions 51f, 52f intersect each other. As shown in FIG. 4B, in the laminated short-circuit components 51, 52, the outer terminals 51a, 52a establish surface contact in the direction of lamination. Also, the inner terminals 51e, 52e establish surface contact in the direction of lamination. On the other hand, the coupling portions 51f, 52f do not contact each other in the direction of lamination. After being laminated in the axial direction, the short-circuit components 51, 52 are integrated, for example, by spot-welding the outer terminals 51a, 52a to each other and the inner terminals 51e, 52e to each other.

In the integrated short-circuit components 51, 52, the conductors 41 to 48 (see FIG. 6) that each short-circuit selected ones of the segments 1 to 24 that are in the same potential each include three of the outer terminals 51a, three of the outer terminals 52a, three of the inner terminals 51e, three of the inner terminals 52e, three of the coupling portions 51f, and three of the coupling portions 52f. Specifically, the three outer terminals 51a are arranged at equal angular intervals along the circumferential direction of the insulator 31 (interval of 120°), and the three inner terminals 51e are connected to the three outer terminals 51a by the corresponding coupling portions 51f. The three outer terminals 52a are axially laminated on the three outer terminals 51a, and the three inner terminals 52e are axially laminated on the three inner terminals 51e. The three coupling portions 52f couple the three outer terminals 52a to the three inner terminals 52e. For example, the short-circuit conductor 41 that short-circuits the three segments 1, 9, 17, which are at the same potential, is formed by the outer terminals 51a, 52a, the inner terminals 51e, 52e, and the coupling portions 51f, 52f, which are connected by heavy solid lines and heavy broken lines in FIG. 5.

The insulating member 53, which is made of insulating resin material, is formed to fill the gap between the outer terminals 51a, 52a, the inner terminals 51e, 52e, and the coupling portions 51f, 52f. Therefore, as shown in FIG. 4B, the insulating member 53 is located between the coupling portions 51f and the coupling portions 52f, which are aligned in the direction of lamination, and reliably separates the coupling portions 51f, 52f from each other. The insulating member 53 also prevents each circumferentially adjacent pair of the terminals from contacting each other.

Figure 6:
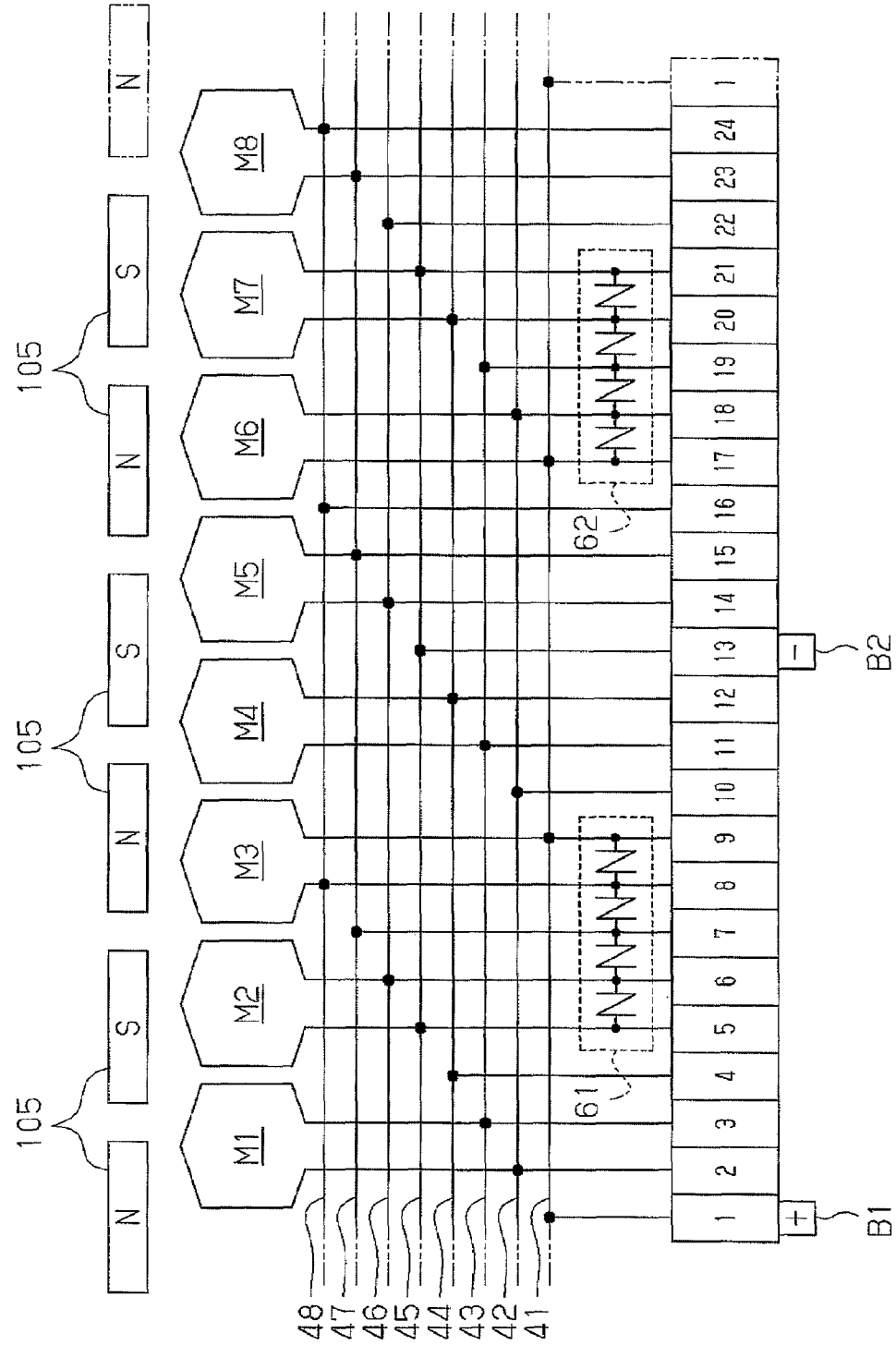
FIG. 6 is a connection diagram of the motor shown in FIG. 1.

The short-circuit member 40 is connected to the segments 1 to 24 by integrally coupling the projections 51b and the projections 52b to the corresponding main body projections 32. In the present embodiment, the sixteen segments 2, 3, 5, 6, 8, 9, 11, 12, 14, 15, 17, 18, 20, 21, 23, 24, that is, the segments other than the eight segments 1, 4, 7, 10, 13, 16, 19, 22, which are arranged at equal angular intervals along the circumferential direction of the insulator 31, are axially laminated on the outer terminals 52a having the connection claws 52c. In this manner, when the short-circuit member 40 forming the eight short-circuit conductors 41 to 48 is electrically connected to the segments 1 to 24, the short-circuit member 40 short-circuits segments of the same potential to one another. Specifically, as shown in FIG. 6, the short-circuit conductor 41 short-circuits the segments 1, 9, 17, the short-circuit conductor 42 short-circuits the segments 2, 10, 18, the short-circuit conductor 43 short-circuits the segments 3, 11, 19, the short-circuit conductor 44 short-circuits the segments 4, 12, 20, the short-circuit conductor 45 short-circuits the segments 5, 13, 21, the short-circuit conductor 46 short-circuits the segments 6, 14, 22, the short-circuit conductor 47 short-circuits the segments 7, 15, 23, and the short-circuit conductor 48 short-circuits the segments 8, 16, 24. In the short-circuit member 40 fixed to the segments 1 to 24, the connection claws 52c extend radially outward from the outer circumferential surfaces of the segments 1 to 24 fixed to the insulator 31.

Also, shown in FIG. 2, the commutator C1 includes two varistors 61, 62 located at an end facing the armature core K. The varistors 61, 62 normally have a higher resistance than that of the coils M1 to M8. When a high voltage is applied, the resistance of the varistors 61, 62 is quickly reduced.

As shown in FIG. 3, the two varistors 61, 62 have shapes that are symmetric with respect to a point on a center axis L1 of the insulator 31 as viewed in the axis L1, and are arranged at positions that are symmetric with respect to the point. The center axis L1 passes through the radial center of the insulator 31. Specifically, the varistors 61, 62 are arcuate and have a center of curvature that coincides with a point on the center axis L1 of the insulator 31. In the first embodiment, the varistor 61 is arranged to face five of the projections 52b that are consecutively arranged along the circumferential direction of the insulator 31. Specifically, the varistor 61 is arranged to face, in the axial direction of the insulator 31, five of the projections 52b that are aligned along the axial direction of the insulator 31 with the five main body projections 32 formed on the segments 5 to 9 (see FIGS. 4A and 4B). The varistor 62 is arranged to face five of the projections 52b that are consecutively arranged along the circumferential direction of the insulator 31. Specifically, the varistor 62 is arranged to face, in the axial direction of the insulator 31, five of the projections 52b that are aligned along the axial direction of the insulator 31 with the five main body projections 32 formed on the segments 17 to 21 (see FIG. 4A). The circumferential dimension of the varistors 61, 62 is slightly less than the circumferential dimension of five of the segments that are consecutively arranged in the circumferential direction of the insulator 31. The radial dimension of the varistors 61, 62 is greater than the radial dimension of the main body projections 32. The axial dimension of the varistors 61, 62 is substantially equal to the total thickness of the main body projections 32 and the projections 51b, 52b, which are laminated in the axial direction of the insulator 31.

Five connection electrodes 61a, 62a shaped as rectangles with rounded corners are located on a surface of the varistors 61, 62 that face the projections 52b in the axial direction of the insulator 31. The connection electrodes 61a, 62a are arranged at equal angular intervals along the circumferential direction of the insulator 31, and the intervals are set equal to the circumferential intervals of the main body projections 32. The five connection electrodes 61a provided on the varistor 61 are welded to the projections 52b that are axially aligned with the main body projections 32 formed on the segments 5 to 9. The five connection electrodes 62a provided on the varistor 62 are welded to the projections 52b that are axially aligned with the main body projections 32 formed on the segments 17 to 21. When the main body projections 32 and the projections 51b, 52b are welded to connect the segments 1 to 24 to the short-circuit member 40, the connection electrodes 61a, 62a are also welded to the projections 52b. When the short-circuit member 40 is connected to the varistors 61, 62, each of the short-circuit conductors 41 to 48 is connected to at least one of the varistors 61, 62 as shown in FIG. 6.

In the commutator C1 described above, each connection claw 52c is connected to corresponding one of the ends of the coils M1 to M8 as shown in FIG. 1. More specifically, two of the connection claws 52c that correspond to one of eight adjacent pairs of segments along the circumferential direction of the commutator C1, or the segments 2 and 3, the segments 5 and 6, the segments 8 and 9, the segments 11 and 12, the segments 14 and 15, the segments 17 and 18, the segments 20 and 21, and the segments 23 and 24, are each connected to one of the ends of the corresponding one of the coils M1 to M8. For example, two of the connection claws 52c that correspond to the segments 2 and 3 are each connected to one of the ends of the coil M1, so that the ends of the coil M1 are electrically connected to the segments 2 and 3. After the coils M1 to M8 are wound, the ends of the coil M1 to M8 are tightly held by the connection claws 52c by folding the bent pieces 52d toward the radial center of the commutator C1, and connected to the connection claws 52c, for example, by fusing.

As shown in FIG. 6, in the commutator C1 of the first embodiment, the varistor 61 is directly connected to the short-circuit conductors 41 and 45 to 48, and the varistor 62 is directly connected to the short-circuit conductors 41 to 45. In this manner, the varistors 61, 62 are electrically interposed among the short-circuit conductors 41 to 48, and connected to the short-circuit member 40 forming the eight short-circuit conductors 41 to 48. Since at least one of the varistors 61, 62 is connected to the short-circuit conductors 41 to 48 (short-circuit member 40), the ends of each of the coils M1 to M8 are electrically connected to either of the varistors 61, 62 via the short-circuit conductors 41 to 48, and each of the coils M1 to M8 and one of the varistors 61, 62 form a parallel circuit.

Also, the connection electrode 61a connected to the segment 9 and formed at one circumferential end of the varistor 61 is connected at the same potential to the connection electrode 62a connected to the segment 17 and formed at one circumferential end of the varistor 62. Likewise, the connection electrode 61a connected to the segment 5 and formed at the other circumferential end of the varistor 61 is connected at the same potential to the connection electrode 62a connected to the segment 21 and formed at the other circumferential end of the varistor 62. Thus, either one of the varistors 61, 62 is electrically interposed between any adjacent pair of the segments 1 to 24.

The operation of the above motor 101 will now be described.

When an electric current is selectively supplied to the coils M1 to M8 from the external power supply through the anode brush B1 and the cathode brush B2, the coils M1 to M8 generate a rotating magnetic field, and the armature 103 is rotated. When the armature 103 rotates, the commutator C1 is rotated, accordingly. Then, the anode brush B1 and the cathode brush B2, which slide on the segments 1 to 24 of the commutator C1, consecutively rectify the coils M1 to M8. At this time, when there is a sign of a high voltage between a brush and segments to which the ends of a coil that is being rectified are connected, the resistance of either one of the varistors 61, 62 that is connected in parallel to the coil is reduced so that spark discharge generated between the commutator C1 and the brush is decreased, and the current flows through one of the varistors 61, 62. This lowers the voltage between the brush and the segments to which the ends of the coil that is being rectified are connected, which suppresses spark discharge. When the voltage between the brush and the segments to which the ends of the coil that is being rectified are connected is lowered, the resistance of one of the varistors 61, 62 is returned to a value higher than the resistance of the coil.

As described above, the first embodiment has the following advantages.

(1) In the commutator C1 of the first embodiment, the varistor 61 is directly connected to the short-circuit conductors 41 and 45 to 48, and the varistor 62 is directly connected to the short-circuit conductors 41 to 45. When the short-circuit conductors 41 to 48 are connected to at least one of the varistors 61, 62, the segments 1 to 24, which are short-circuited by the short-circuit conductors 41 to 48, are connected to at least one of the varistors 61, 62 via the short-circuit conductors 41 to 48. Therefore, among the sixteen segments 2, 3, 5, 6, 8, 9, 11, 12, 14, 15, 17, 18, 20, 21, 23, 24 to which the ends of the coils M1 to M8 are connected, segments having the same potential are each connected to at least one of the varistors 61, 62 when the short-circuit conductors to which the segments are connected are connected to at least one of the varistors 61, 62, even if the segments are not directly connected to at least one of the varistors 61, 62. As a result, the number of connection portions between the eight pairs of the sixteen segments 2 to 24, and the varistors 61, 62, which connection portions are provided for electrically interposing either one of the varistors 61, 62 between each pair of the segments to which the ends of one of the coils M1 to M8 are connected, can be set to ten, which less than the number of the ends of the coils M1 to M8 in the motor 101. That is, by providing ten connection portions (connection electrodes 61a) between the eight pairs of the sixteen segments 2 to 24 and the varistors 61, 62, the manufacturing procedure of the commutator C1 is simplified, and the productivity of the commutator C1 is improved. This improves the productivity of the motor 101.

(2) The numbers of the connection electrodes 61a, 62a provided in the varistors 61, 62 are each five. The connection electrodes 61a, 62a are connected to the short-circuit conductors 41 to 48, which are connected to the circumferentially consecutive segments 5 to 9, and 17 to 21. This configuration permits either one of the varistors 61, 62 to be electrically interposed between any circumferentially adjacent pair of the segments 1 to 24. Also, since the varistor 61 is connected to the circumferentially consecutive five segments 5 to 9 via the short-circuit member 40, varistors that should be connected to the circumferentially consecutive segments 5 to 9 can be integrated as the single varistor 61. Likewise, since the varistor 62 is connected to the circumferentially consecutive five segments 17 to 21 via the short-circuit member 40, varistors that should be connected to the circumferentially consecutive segments 17 to 21 can be integrated as the single varistor 62. Accordingly, the number of the components of the commutator C1 is reduced.

(3) Since the two varistors 61, 62 have shapes that are symmetric with respect to a point on the center axis L1 of the insulator 31 as viewed in the axis L1, the weight of the commutator, which rotates together with the rotary shaft 107, is well balanced. As a result, vibration of the armature 103 when the motor 101 is driven is suppressed.

A second embodiment of the present invention will now be described with reference to FIGS. 7 to 8. Like or the same reference numerals are given to those components that are like or the same as the corresponding components of the first embodiment and detailed explanations are omitted.

Figure 7:
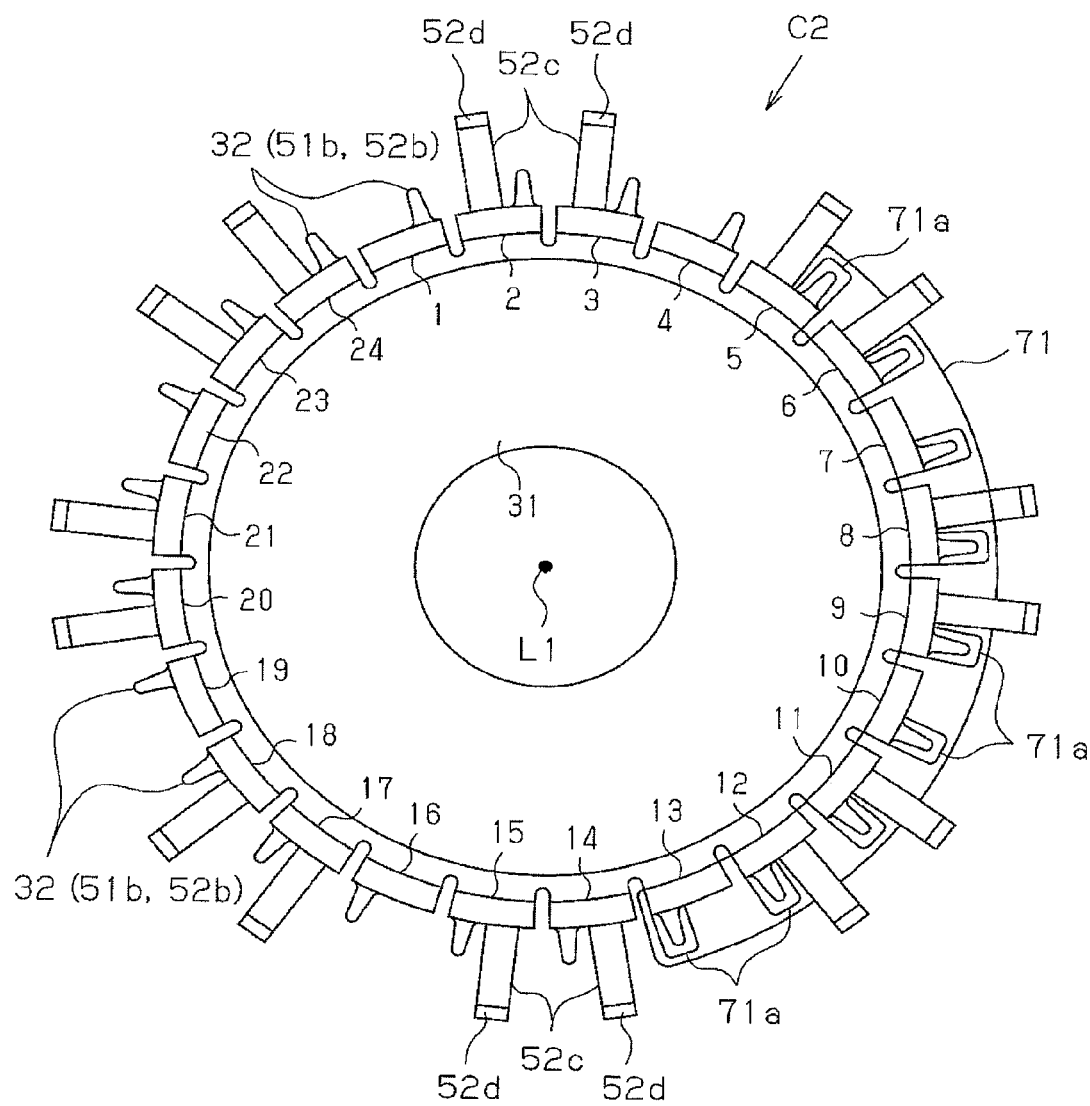
FIG. 7 is a plan view illustrating a commutator according to a second embodiment of the present invention.

A motor according to the second embodiment includes a commutator C2 shown in FIG. 7 instead of the commutator C1 used in the motor according to the first embodiment. The commutator C2 has a single varistor 71 instead of the varistors 61, 62 according to the first embodiment.

Like the varistors 61, 62 of the first embodiment, the varistor 71 normally has a higher resistance than that of the coils M1 to M8. When a high voltage is applied, the resistance of the varistor 71 is quickly reduced. The varistor 71 is arcuate and has a center of curvature that coincides with a point on the center axis L1 of the insulator 31. The varistor 71 is located at a position facing nine of the projections 52*b* that are consecutively arranged along the circumferential direction of the insulator 31. Specifically, the varistor 71 is arranged to face, in the axial direction of the insulator 31, nine of the projections 52*b* that are aligned along the axial direction of the insulator 31 with the main body projections 32 formed on the segments 5 to 13. The circumferential dimension of the varistor 71 is slightly less than the circumferential dimension of nine of the segments that are consecutively arranged in the circumferential direction of the insulator 31. The radial dimension of the varistor 71 is greater than the radial dimension of the main body projections 32. The axial dimension of the varistor 71 is substantially equal to the total thickness of the main body projections 32 and the projections 51*b*, 52*b*, which are laminated in the axial direction of the insulator 31.

Like the connection electrodes 61*a*, 62*a* of the first embodiment, nine connection electrodes 71*a* shaped as rectangles with rounded corners are located on a surface of the varistor 71 that faces the projections 52*b* in the axial direction of the insulator 31. The connection electrodes 71*a* are arranged at equal angular intervals along the circumferential direction of the insulator 31, and the intervals are set equal to the circumferential intervals of the main body projections 32. The nine connection electrodes 71*a* provided on the varistor 71 are welded to the projections 52*b* that are axially aligned with the main body projections 32 formed on the segments 5 to 13. When the main body projections 32 and the projections 51*b*, 52*b* are welded to connect the segments 1 to 24 to the short-circuit member 40, the connection electrodes 71*a* are also welded to the projections 52*b*. When the short-circuit member 40 is connected to the varistor 71, each of the short-circuit conductors 41 to 48 is connected to the varistor 71 as shown in FIG. 8.

Figure 8:
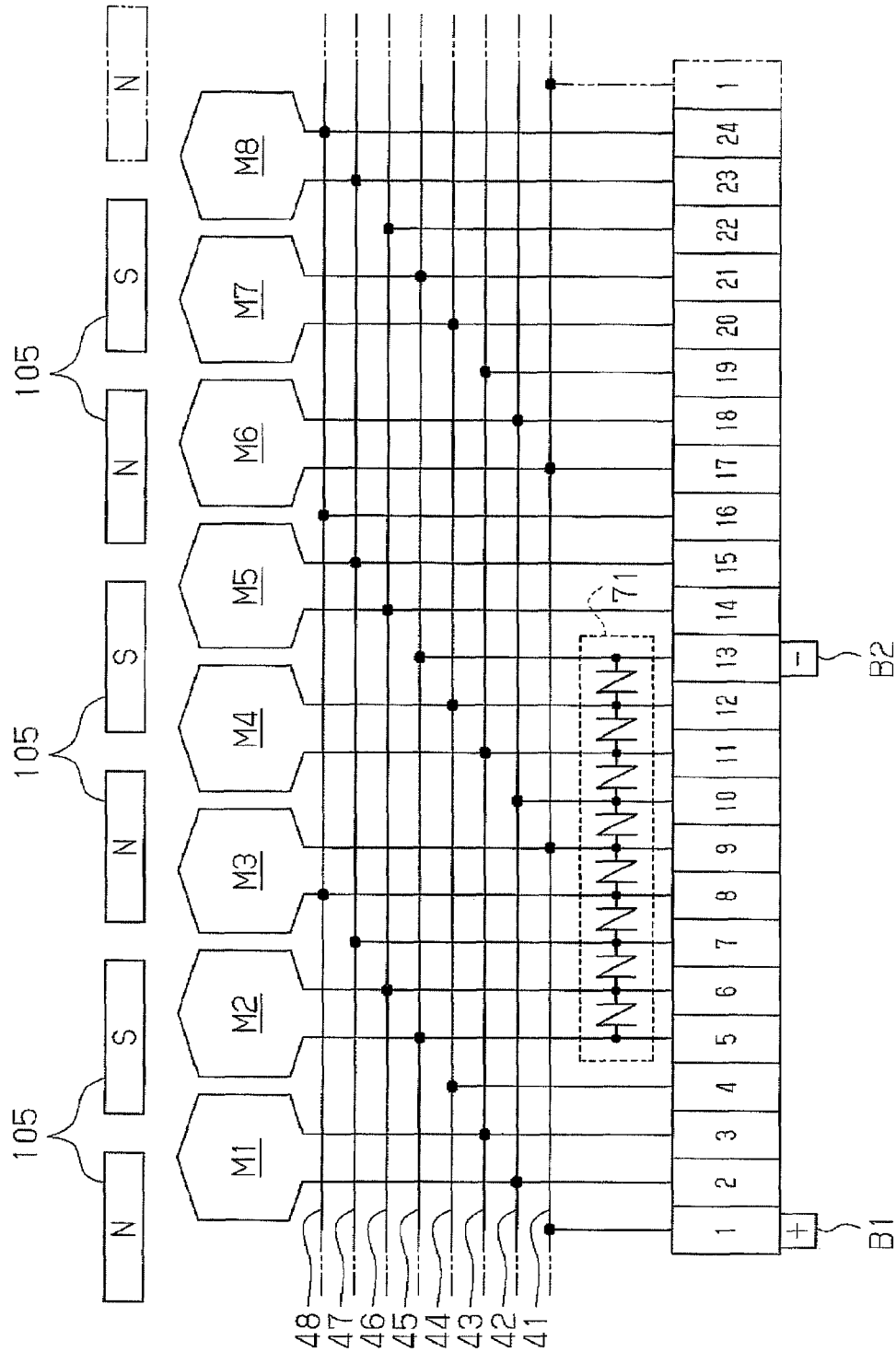
FIG. 8 is a connection diagram of the motor according to the second embodiment.

As shown in FIG. 8, in the commutator C2 of the second embodiment, the varistor 71 is directly connected to the short-circuit conductors 41 to 48. In this manner, the varistor 71 is electrically interposed among the short-circuit conductors 41 to 48, and connected to the short-circuit member 40 forming the eight short-circuit conductors 41 to 48. Since the varistor 71 is connected to the short-circuit conductors 41 to 48, the ends of each of the coils M1 to M8 are electrically connected to the varistor 71 via the short-circuit conductors 41 to 48, and each of the coils M1 to M8 and the varistor 71 form a parallel circuit.

Also, the connection electrode 71*a* connected to the segment 5 and formed at one circumferential end of the varistor 71 is connected at the same potential to the connection electrode 71*a* connected to the segment 13 and formed at the other circumferential end of the varistor 71. Thus, the varistor 71 is electrically interposed between any adjacent pair of the segments 1 to 24.

As described above, the second embodiment has the following advantages.

(1) In the commutator C2 of the second embodiment, the varistor 71 is directly connected to the short-circuit conductors 41 to 48. When the short-circuit conductors 41 to 48 are connected to the varistor 71, the segments 1 to 24, which are short-circuited by the short-circuit conductors 41 to 48, are connected to the varistor 71 via the short-circuit conductors 41 to 48. Therefore, among the sixteen segments 2, 3, 5, 6, 8, 9, 11, 12, 14, 15, 17, 18, 20, 21, 23, 24 to which the ends of the coils M1 to M8 are connected, segments having the same potential are each connected to the varistor 71 when the short-circuit conductors 41 to 48 to which the segments of the same potential are connected are connected to the varistor 71, even if the segments are not directly connected to the varistor 71. As a result, the number of connection portions (the connection electrodes 71*a*) between the eight pairs of the sixteen segments 2 to 24 and the varistor 71, which connection portions are provided for electrically interposing the varistor 71 between each pair of the segments to which the ends of one of the coils M1 to M8 are connected, can be set to nine, which is less than the number of the ends of the coils M1 to M8 in the motor. That is, by providing nine connection portions between the eight pairs of the sixteen segments 2 to 24 and the varistor 71, the manufacturing procedure of the commutator C2 is simplified, and the productivity of the commutator C2 is improved.

(2) The number of the connection electrodes 71*a* provided in the varistor 71 is nine. The connection electrodes 71*a* are connected to the short-circuit conductors 41 to 48, which are connected to the circumferentially consecutive segments 5 to 13. This configuration permits the varistor 71 to be electrically interposed between any circumferentially adjacent pair of the segments 1 to 24.

(3) Since only the single varistor 71 is provided in the commutator C2, the number of components is reduced.

A third embodiment of the present invention will now be described with reference to FIGS. 9A to 11. Like or the same reference numerals are given to those components that are like or the same as the corresponding components of the first embodiment and detailed explanations are omitted.

Figure 9A:
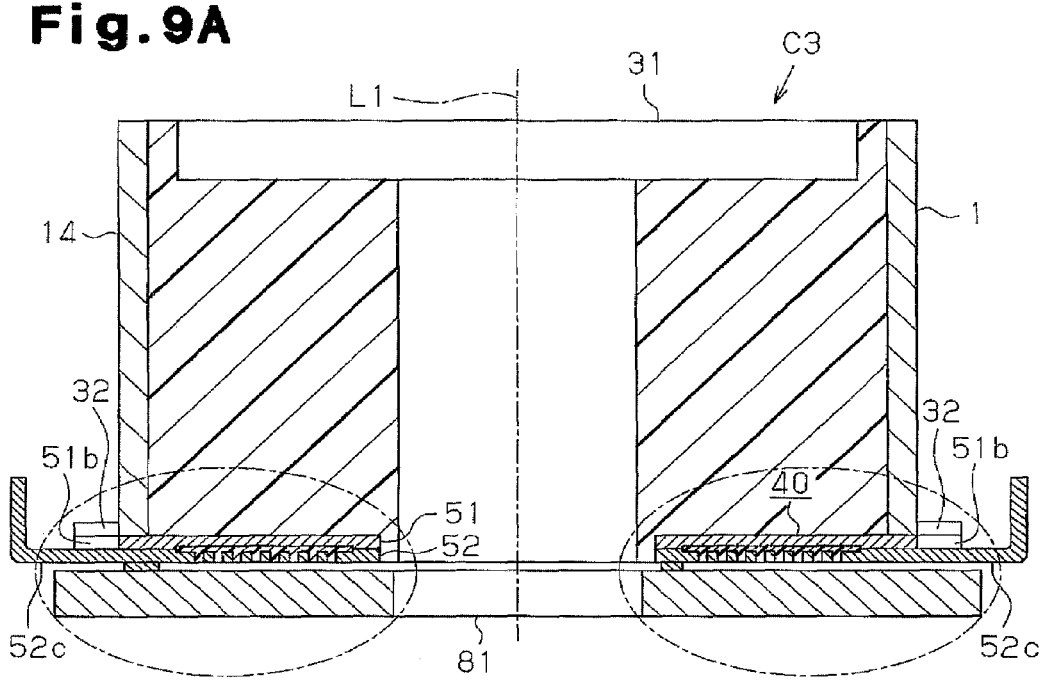
FIG. 9A is an axial cross-sectional view of a commutator according to a third embodiment of the present invention (cross-sectional view taken along line A2-A2 of FIG. 10)
Figure 9B:
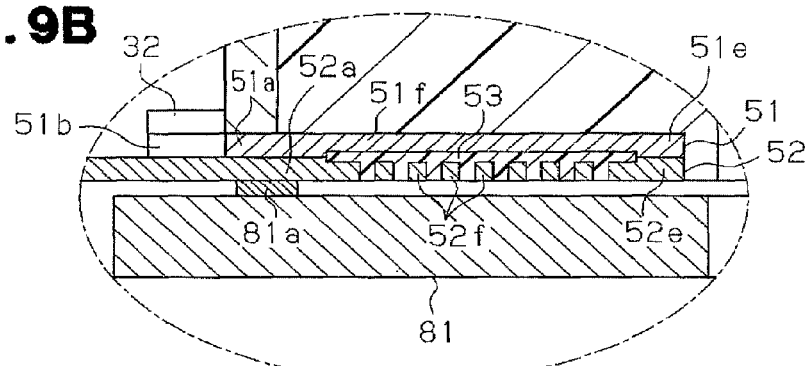
FIGS. 9B and 9C are partially enlarged views of FIG. 19A.
Figure 9C:
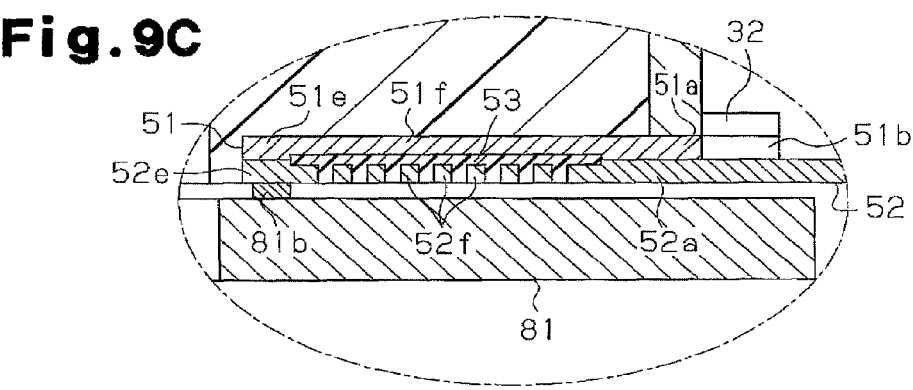
Figure 10:
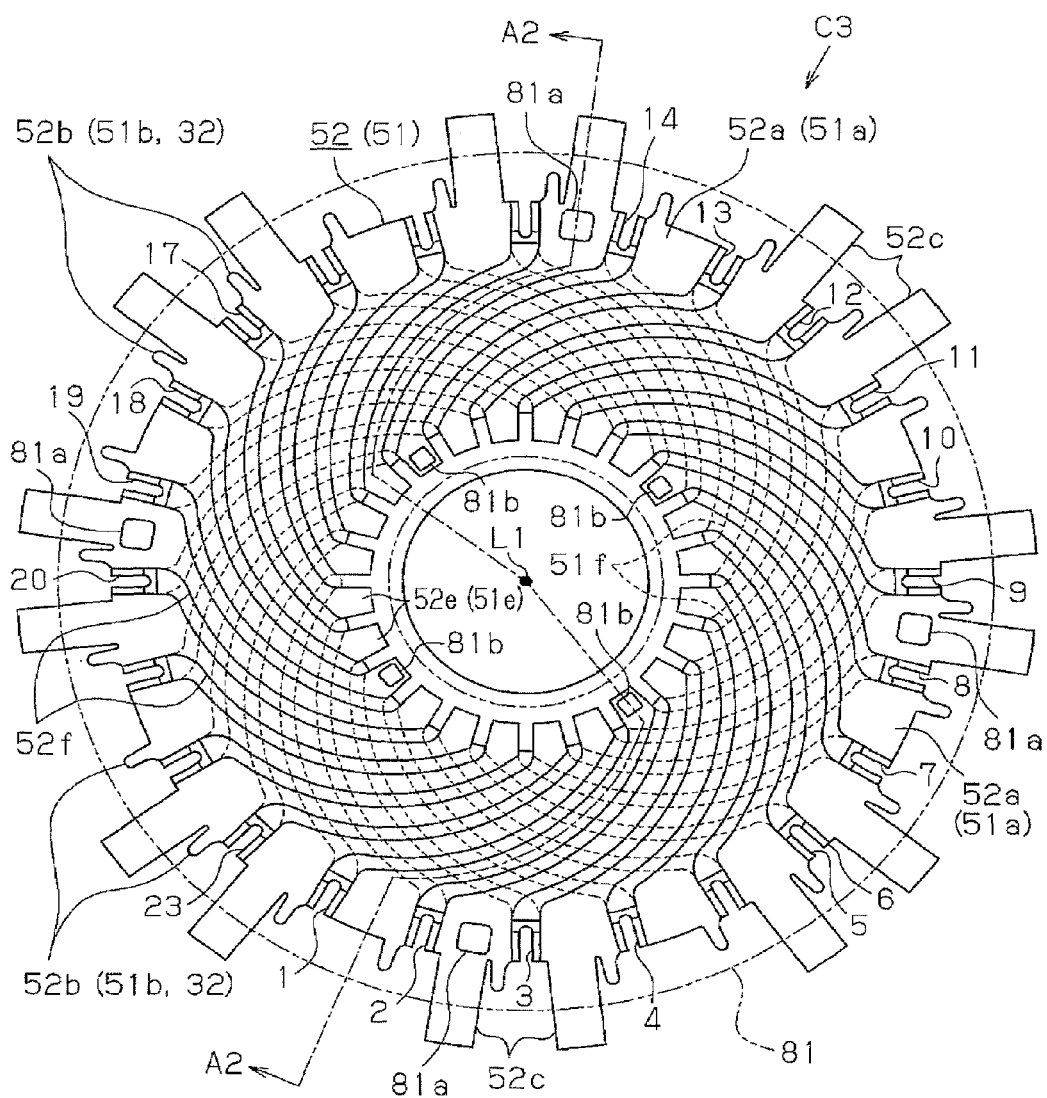
FIG. 10 is a bottom view illustrating the commutator according to the third embodiment of the present invention.

A motor according to the third embodiment includes a commutator C3 shown in FIG. 9A instead of the commutator C1 used in the motor according to the first embodiment. The commutator C3 has a single varistor 81 instead of the varistors 61, 62 according to the first embodiment. FIG. 9A is an axial cross-sectional view of the commutator C3, and FIG. 10 is a bottom view of the commutator C3. In FIG. 10, the varistor 81 is shown by a two-dot chain line.

Like the varistors 61, 62 of the first embodiment, the varistor 81 normally has a higher resistance than that of the coils M1 to MB. When a high voltage is applied, the resistance of the varistor 81 is quickly reduced. As shown in FIGS. 9A to 9C and 10, the varistor 81 is annular and has a center on the center axis L1 of the insulator 31. In the axial direction of the insulator 31, the varistor 81 faces the inner terminals 52e. The outer diameter of the varistor 81 is larger than that of a circle containing the distal ends of he main body projections 32. The inner diameter of the varistor 81 is less than that of a circle containing the radially inner ends of the inner terminals 51e, 52e. The axial dimension of the varistor 81 is substantially equal to the total thickness of the main body projections 32 and the projections 51b, 52b, which are laminated in the axial direction of the insulator 31.

Four outer electrodes 81a and four inner electrodes 81b are provided on a surface of the varistor 81 that faces the projections 52b in the axial direction of the insulator 31. The electrodes 81a, 81b connect the short-circuit member 40 to the varistor 81. The outer electrodes 81a shaped as rectangles with rounded corners are arranged to face four of the outer terminals 52a that are aligned in the axial direction of the insulator 31 with the four segments 2, 8, 14, 20, which are arranged at equal angular intervals in the circumferential direction of the insulator 31. That is, the four outer electrodes 81a are arranged at equal angular intervals in the circumferential direction of the insulator 31 on a surface of the varistor 81 that faces the projections 52b in the axial direction of the insulator 31.

On the other hand, the inner electrodes 81b shaped as rectangles with rounded corners are arranged to face four of the inner terminals 51e, 52e that are arranged at equal angular intervals in the circumferential direction of the insulator 31, and each of the four inner terminals 51e, 52e is located in the middle between one of the adjacent pairs of the outer electrodes 81a in the circumferential direction of the insulator 31. That is, the four inner electrodes 81b are arranged at equal angular intervals in the circumferential direction on the surface of the varistor 81 that faces the projections 52b in the axial direction of the insulator 31.

Figure 11:
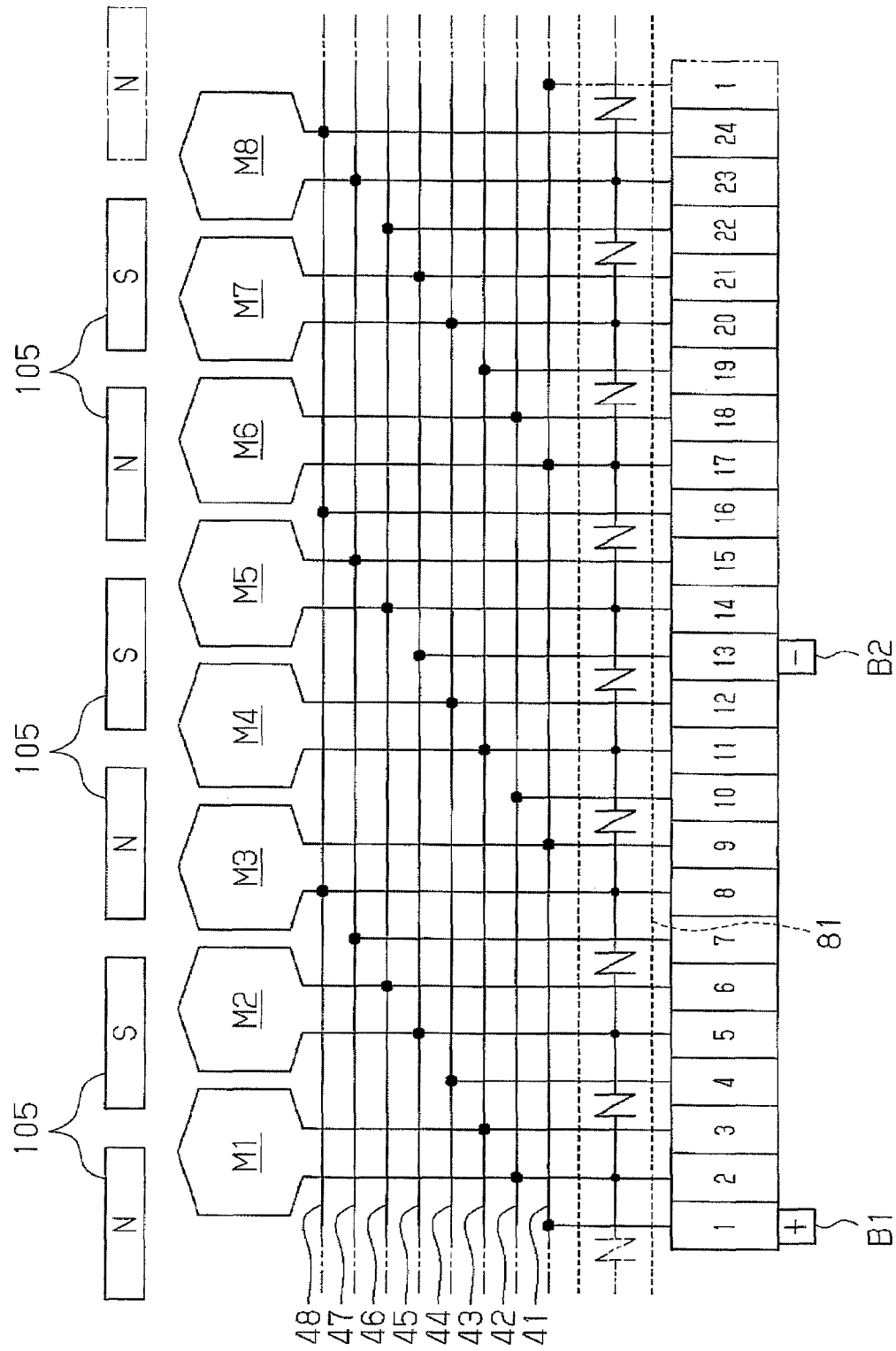
FIG. 11 is a connection diagram of the motor according to the third embodiment.

The outer electrodes 81a and the inner electrodes 81b are welded to the opposed outer terminals 52a and inner terminals 52e. Specifically, the outer terminals 52a that are axially aligned with the segments 2, 8, 14, 20 arranged at equal angular intervals (in this embodiment, 90° intervals) are welded to the four outer electrodes 81a formed on the varistor 81. On the other hand, four of the inner terminals 52e that are arranged at equal angular intervals in the circumferential direction of the insulator 31, or the inner terminal 52e located at an intermediate position between the segment 2 and the segment 8, the inner terminal 52e located at an intermediate position between the segment 8 and the segment 14, the inner terminal 52e located at an intermediate position between the segment 14 and the segment 20, and the inner terminal 52e located at an intermediate position between the segment 20 and the segment 2 are welded to the four inner electrodes 81b, respectively. In this manner, as shown in FIG. 11, each of the short-circuit conductors 41 to 48 is connected to the varistor 81. The outer terminals 52a to which the outer electrodes 81a are connected are coupled by coupling portions 52f to the inner terminals 52e to which the inner electrodes 81b are not connected. The inner terminals 52e to which the inner electrodes 81b are connected are coupled by coupling portions 52f to the outer terminals 52a to which the outer electrodes 81a are not connected.

When the varistor 81 is electrically connected to the short-circuit conductors 41 to 48 in the above described manner as shown in FIG. 11, the varistor 81 is electrically interposed among the short-circuit conductors 41 to 48, and is connected to the short-circuit member 40 forming the eight short-circuit conductors 41 to 48. Since the varistor 81 is connected to the short-circuit conductors 41 to 48, the ends of each of the coils M1 to M8 are electrically connected to the varistor 81 via the short-circuit member 40, and each of the coils M1 to M8 and the varistor 81 form a parallel circuit.

The varistor 81 is connected to every other one of sections between the adjacent pairs of the segments 1 to 24 in the circumferential direction of the insulator 31. Thus, the varistor 81 is electrically interposed between any adjacent pair of the segments 1 to 24 via the short-circuit conductors 41 to 48.

As described above, the third embodiment has the following advantages.

(1) In the commutator C3 of the third embodiment, the varistor 81 is directly connected to the short-circuit conductors 41 to 48. When the short-circuit conductors 41 to 48 are connected to the varistor 81, the segments 1 to 24, which are short-circuited by the short-circuit conductors 41 to 48, are connected to the varistor 81 via the short-circuit conductors 41 to 48. Therefore, among the sixteen segments 2, 3, 5, 6, 8, 9, 11, 12, 14, 15, 17, 18, 20, 21, 23, 24 to which the ends of the coils M1 to M8 are connected, segments having the same potential are each connected to the varistor 81 when the short-circuit conductors 41 to 48 to which the segments of the same potential are connected are connected to the varistor 81, even if the segments are not directly connected to the varistor 81. As a result, the number of connection portions (the outer electrodes 81a and the inner electrodes 81b) between the eight pairs of the sixteen segments 2 to 24 and the varistor 81, which connection portions are provided for electrically interposing the varistor 81 between each pair of the segments to which the ends of one of the coils M1 to M8 are connected, can be set to eight, which is less than the number of the ends of the coils M1 to M8 in the motor. That is, by providing eight connection portions between the eight pairs of the sixteen segments 2 to 24 and the varistor 81, the manufacturing procedure of the commutator C3 is simplified, and the productivity of the commutator C3 is improved.

(2) In the commutator C3 of the third embodiment, the outer terminals 52a that are axially aligned with the segments 2, 8, 14, 20 arranged at equal angular intervals (in this embodiment, 90° intervals) are welded to the four outer electrodes 81a located on the varistor 81. Further, the four inner terminals 52e arranged at equal angular intervals in the circumferential direction are welded to the inner electrodes 81b located on the varistor 81. Therefore, the circumferential distance between each circumferentially adjacent pair of the outer electrodes 81a and the inner electrodes 81b is widened. This prevents segments that do not need to be short-circuited from being short-circuited by contact between the electrodes 81a, 81b. The varistor 81 is connected to the same number of the outer terminals 52a and the inner terminals 52e, and the connected outer terminals 52a and inner terminals 52e are arranged at equal angular intervals in the circumferential direction. The varistor 81 is thus stably fixed to the short-circuit member 40.

(3) Since only the single varistor 81 is provided in the commutator C3, the number of components is reduced.

(4) In the third embodiment, since the varistor 81 is annular, the volume of the varistor 81, which forms parallel circuits with the coils M1 to M8, is greater than those in the first and second embodiments. Therefore, compared to the first and second embodiments, spark discharge is more effectively suppressed.

The first to third embodiments may be modified as follows.

In the first embodiment, the varistors 61, 62 are symmetric with respect to a point on the center axis L1 of the insulator 31 when viewed along the center axis L1. However, the varistors 61, 62 do not need to be symmetric with respect to a point. That is, the varistors 61, 62 may have any form other than an arcuate form as long as the five connection electrodes 61a, 62a can be located on the varistors 61, 62, respectively.

In the first embodiment, the varistor 61 is connected to the five circumferentially consecutive segments 5 to 9 via the short-circuit member 40. The varistor 62 is also connected to the five circumferentially consecutive segments 17 to 21 via the short-circuit member 40. However, the varistors 61, 62 may be connected to any five circumferentially consecutive sets of the segments via the short-circuit member 40 as long as two sets of the connection electrodes 61a, 62a that face each other in the circumferential direction in FIG. 3 as in the first embodiment are each connected to segments of the same potential.

In the first embodiment, the commutator C1 has the two varistors 61, 62 that have the five connection electrodes 61a, 62a, respectively. However, the number of varistors in the commutator C1 is not limited to two. Assume that the number of magnetic poles and the number of coils are represented by symbols P and C, respectively. In the commutator C1 of a configuration in which the number of segments is represented by (P×C)/2, and a short-circuit conductor short-circuits segments the number of which is represented by P/2, the segments spaced by an angle of 360°/(P/2), the number n of varistors may be any positive divisor of C other than one. In this case, each of the n varistors has connection electrodes the number of which is represented by (C/n)+1. The connection electrodes in each varistor are connected either to circumferentially consecutive segments or short-circuit conductors connected to the segments.

In the second embodiment, the varistor 71 is connected to the nine circumferentially consecutive segments 5 to 13 via the short-circuit member 40. However, the varistor 71 may be connected to any set of nine circumferentially consecutive segments via the short-circuit member 40.

In the first and second embodiments, the varistors 61, 71 are connected to the corresponding ones of the segments 1 to 24 via the projections 52b formed on the outer terminals 52a. However, the varistors 61, 71 may be directly connected to the corresponding segments.

In the first and second embodiments, the numbers of the connection electrodes 61a, 62a, 71a may be increased as long as the numbers are less than the number of the ends of the coils M1 to M8 (which is the same as the double the number of the short-circuit conductors 41 to 48). However, the sum of the numbers of the connection electrodes 61a, 62a is set to be less than the number of the ends of the coils M1 to M8.

In the above embodiments, varistors are used as surge absorbing elements the resistance of which is changed so as to reduce spark discharge generated among the segments 1 to 24, the anode brush B1, and the cathode brush B2. However, surge absorbing element other than varistors, for example, semiconductors or capacitors, may be used for reduce spark discharge. For example, two Zener diodes that are arranged face to face and connected to each other (the cathodes of the diodes are connected to each other) may be used instead of the varistors.

In the above embodiments, the short-circuit conductors 41 to 48 for short-circuiting the segments 1 to 24 at the same potential are formed by the short-circuit member 40. However, the short-circuit conductors 41 to 48 may be formed by conducting wires.

In the motor 101 of the above embodiments, the number of poles P is six, and the number of coils C is eight. However, the number of poles P and the number of coils C may be greater than these numbers. In this case, the number of the segments is changed as necessary in accordance with the number of poles P and the number of the coils C. Also, the number of the connection electrodes in the varistor may be changed as necessary in accordance with the number of the ends of the coils within a range less than the number of the coil ends. For example, in the case where a commutator includes a single varistor as in the second embodiment, the varistor is provided with connection electrodes the number of which is represented by (C+1) if the number of segments is (P×C)/2, a short-circuit conductor connects segments, the number of which is represented by P/2, to each other, and the segments are located at positions corresponding to 360°/(P/2). The connection electrodes in each varistor are connected either to circumferentially consecutive segments or short-circuit conductors connected to the segments.

A fourth embodiment of the present invention will now be described with reference to FIGS. 12 to 19.

Figure 12:
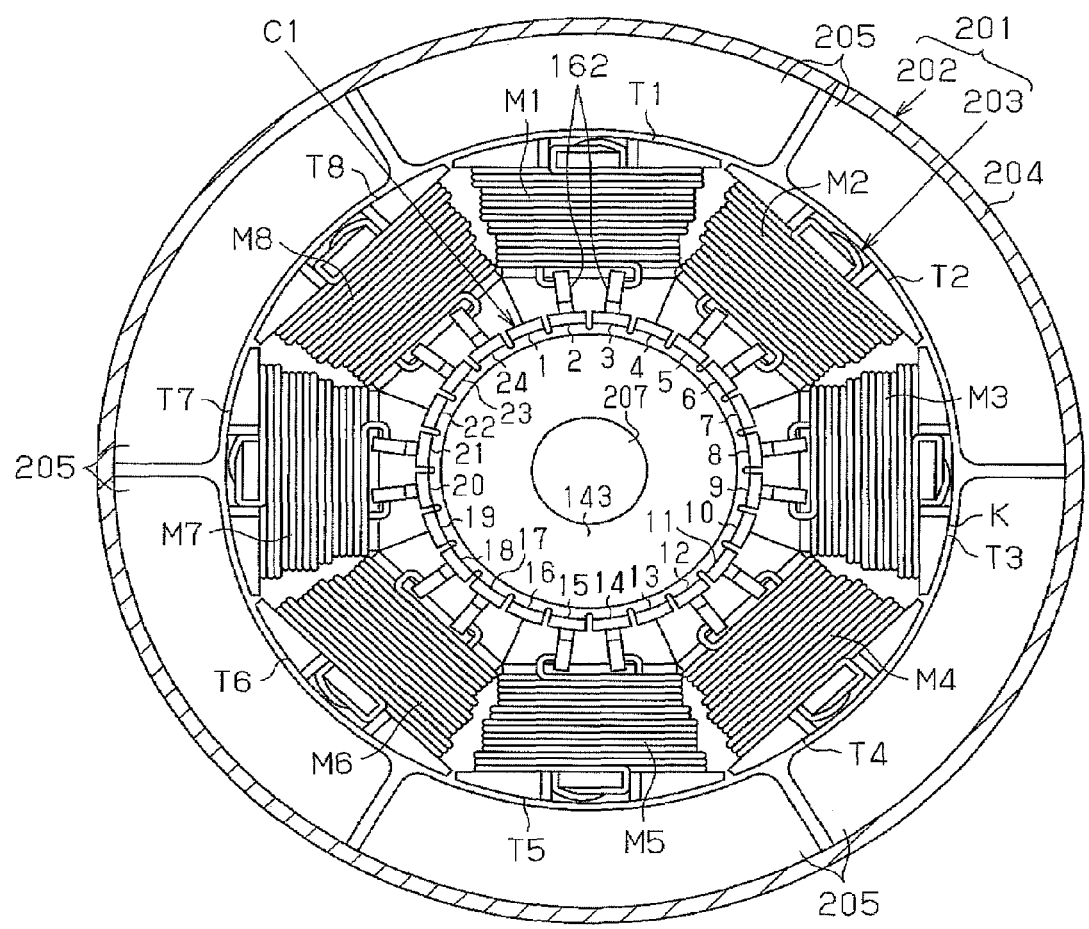
FIG. 12 is a radial cross-sectional view illustrating a motor according to a fourth embodiment of the present invention.
Figure 13:
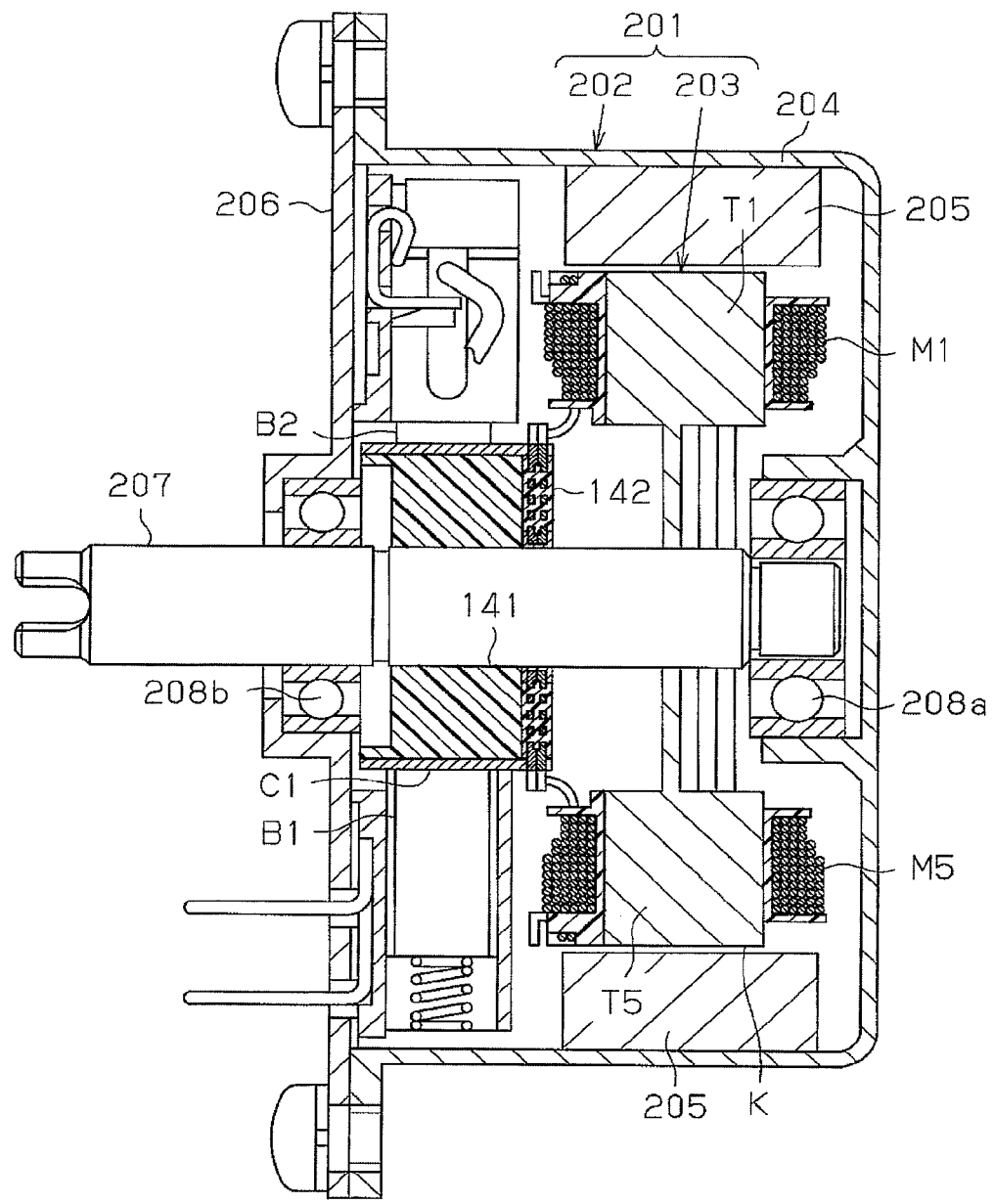
FIG. 13 is an axial cross-sectional view of the motor shown in FIG. 12.

A motor 201 according to the present embodiment will now be described. As shown in FIGS. 12 and 13, the motor 201 includes a stator 202 and an armature 203 located inside of the stator 202. A yoke housing 204 forming the stator 202 is formed as a cylinder with a bottom and has six permanent magnets 205 fixed to the inner circumferential surface. The permanent magnets 205 are arranged at equal angular intervals along the circumferential direction of the yoke housing 204. The opening of the yoke housing 204 is closed by a substantially disk-shaped end frame 206. The end frame 206 supports an anode brush B1 and a cathode brush B2, which function as electricity supplying brushes connected to an external power supply.

The armature 203 is located inside of the six permanent magnets 205. A rotary shaft 207 of the armature 203 is rotatably supported by bearings 208a, 208b that are fixed to a center of the bottom of the yoke housing 204 and a center of the end frame 206, respectively. An end of the rotary shaft 207 extends from the center of the end frame 206 toward the outside of the yoke housing 204.

An armature core K is fixed to the rotary shaft 207. The armature core K is arranged to face the permanent magnets 205 in the radial direction. The armature core K includes eight teeth T1 to T8 radially extending from the rotary shaft 207. The motor 201 includes eight coils M1 to M8, each of which is wounded by means of concentrated winding about one of the teeth T1 to T8.

A commutator C1 is fixed to a portion of the rotary shaft 207 located between the end frame 206 and the armature core K. The commutator C1 is connected to ends of the coils M1 to M8. The commutator C1 includes a commutator main body 141 fixed to the rotary shaft 207, and a short-circuit member 142 fixed to an axial end of the commutator main body 141 (left end as viewed in FIG. 13).

Figure 14A:
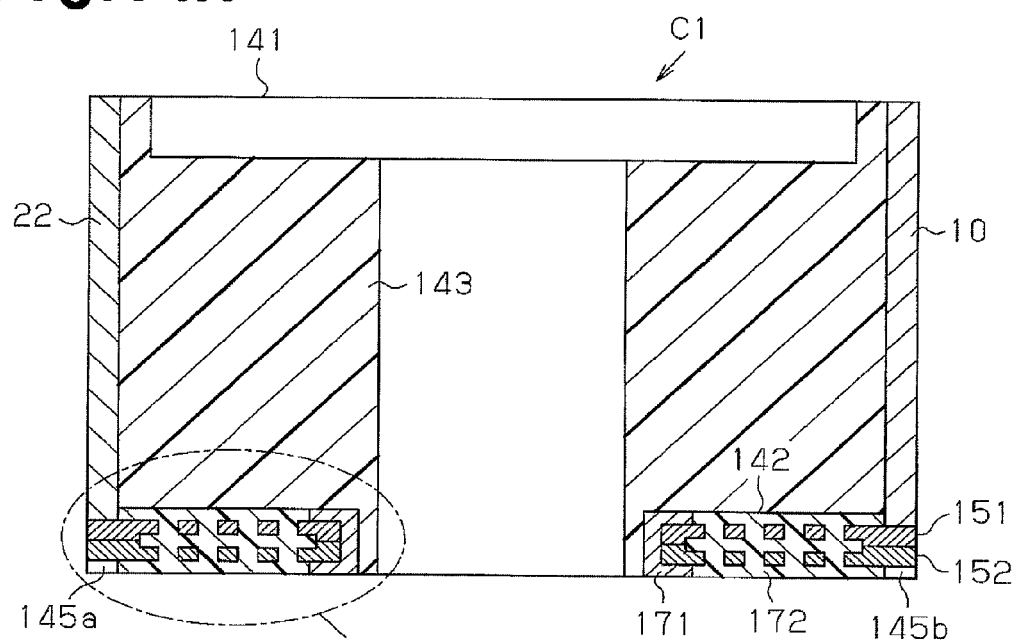
FIG. 14A is an axial cross-sectional view of a commutator of the motor shown in FIG. 12.
Figure 14B:
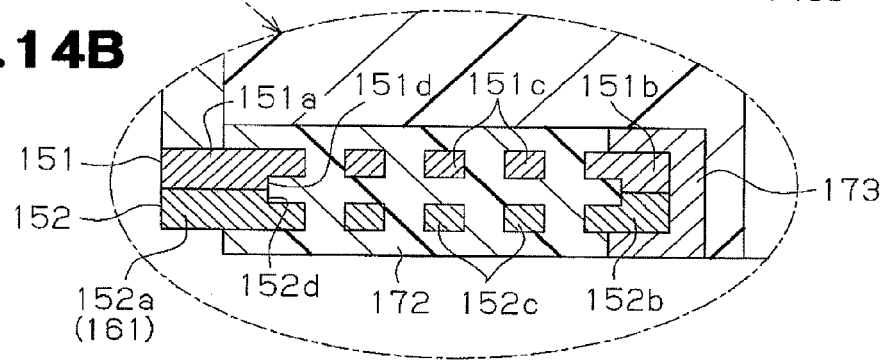
FIG. 14B is a partially enlarged view of FIG. 14A.
Figure 16:
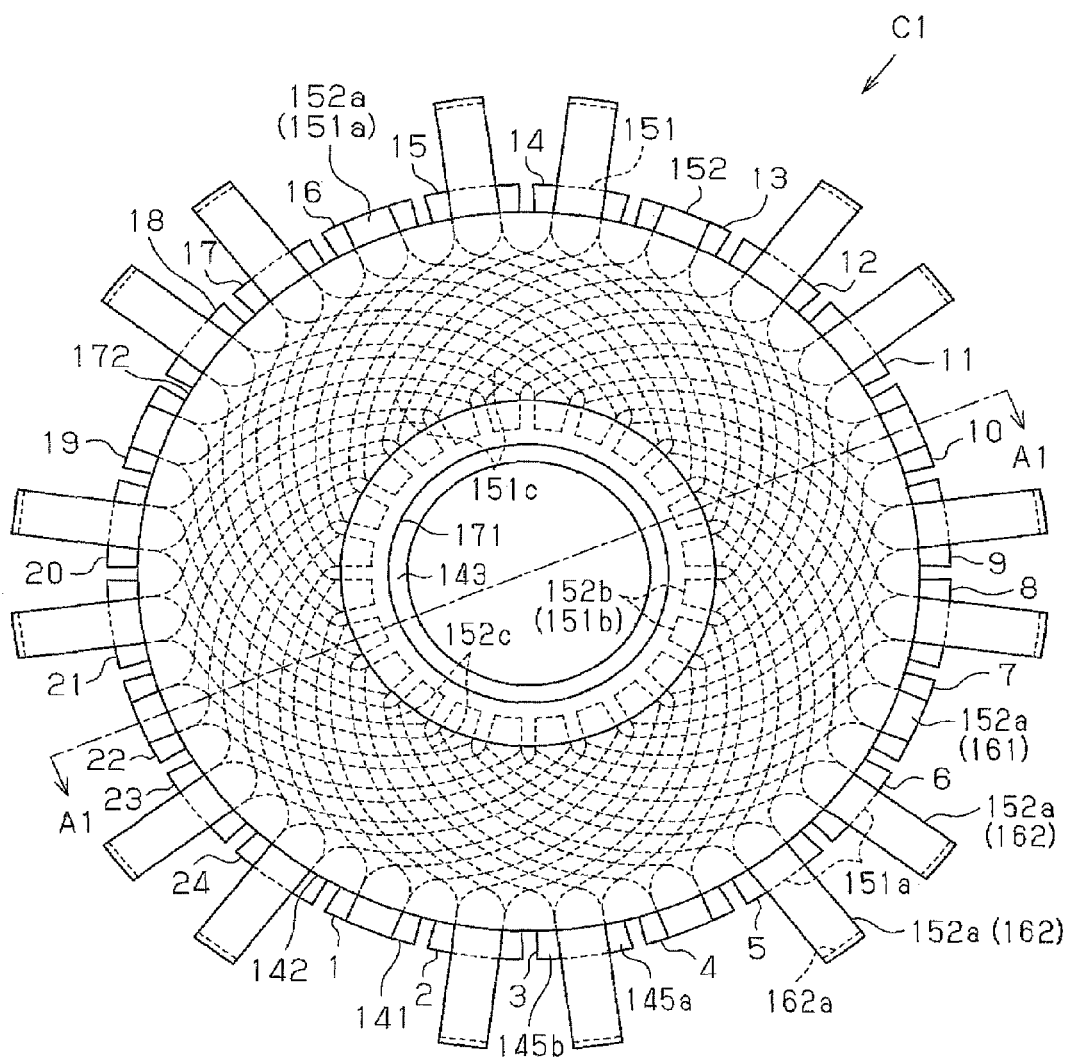
FIG. 16 is a bottom view of the commutator of the motor shown in FIG. 12.

As shown in FIGS. 14A and 16, the commutator main body 141 includes a substantially cylindrical insulator 143 made of insulating resin material, and substantially rectangular twenty-four segments 1 to 24 attached to the outer circumferential surface of the insulator 143. The lower end surface of the insulator 143 in FIGS. 14A and 14B is formed to be parallel to a plane perpendicular to the center axis of the insulator 143.

The twenty-four segments 1 to 24 are provided on the outer circumferential surface of the insulator 143 such that a gap exists between each adjacent pair of the segments in the circumferential direction of the insulator 143. The anode brush B1 and the cathode brush B2 slide on the segments 1 to 24 (see FIG. 13) from the radially outside.

Figure 15:
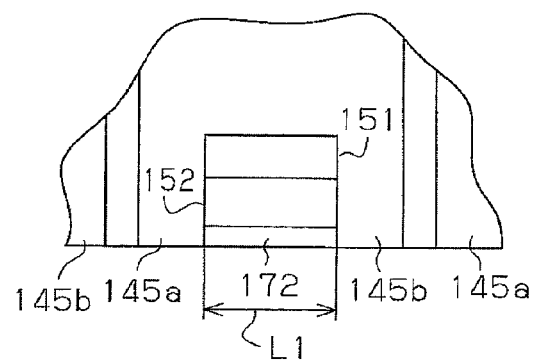
FIG. 15 is a partially enlarged view of the commutator of motor shown in FIG. 12, showing a connecting state of an outer terminal and a segment.

Each of the segments 1 to 24 has, at its lower end as viewed in FIG. 14A, a pair of circumferentially aligned swage projections 145a, 145b extending from the lower end along the axial direction of the insulator 143 (see FIG. 15). When the segments 1 to 24 are fixed to the outer circumferential surface of the insulator 143, the swage projections 145a, 145b project further downward than the lower end surface of the insulator 143 as viewed in FIG. 14A.

Figure 17:
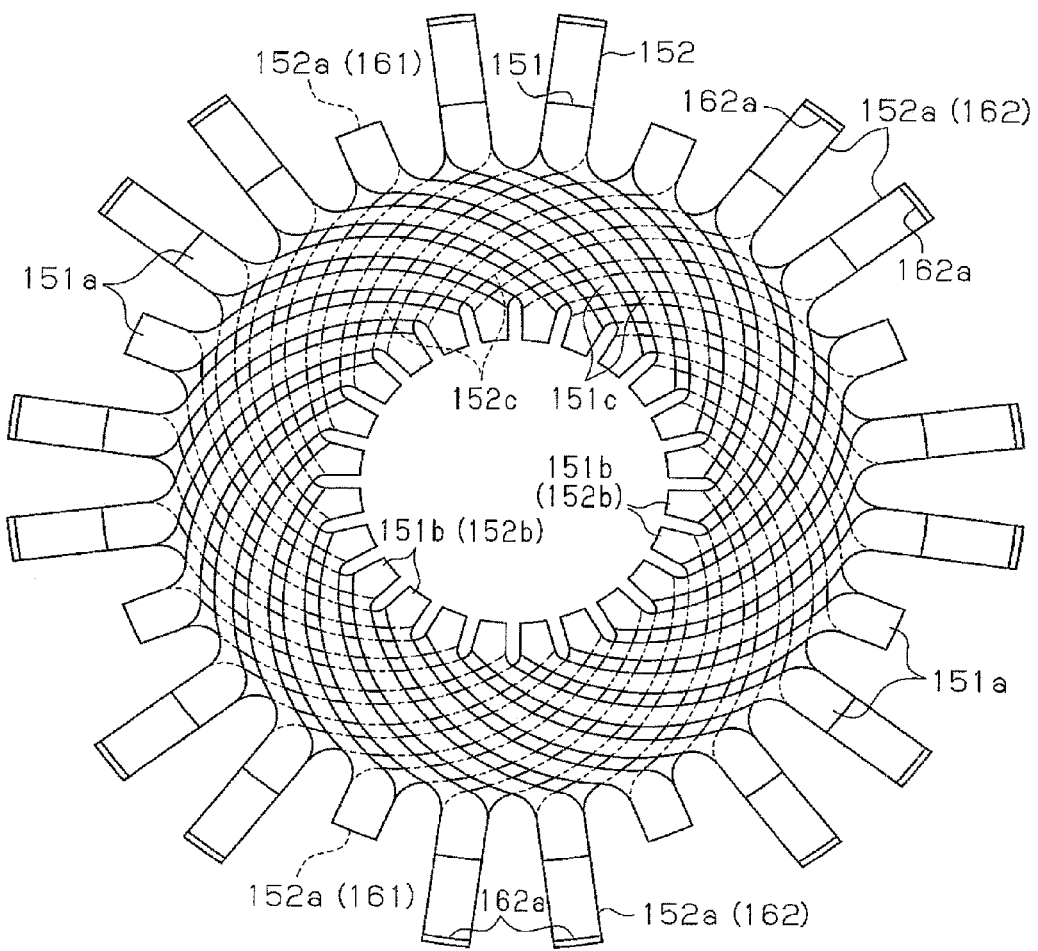
FIG. 17 is a plan view of a short-circuit component of the motor shown in FIG. 12.

The short-circuit member 142 includes two short-circuit components 151, 152, which are formed by punching conductive material (for example, copper plates) and have the same shape. As shown in FIG. 17, the first and second short-circuit components 151, 152 have twenty-four (that is, the same number as the segments 1 to 24) outer terminals 151a, 152a, respectively. The outer terminals 151a, 152a are arranged at equal angular intervals along the circumferential direction of the insulator 143. All the twenty-four outer terminals 151a have a substantially rectangular shape, and a circumferential width equal to a distance L1 (see FIG. 15) between each pair of the swage projections 145a, 145b formed on each of the segments 1 to 24.

Among the twenty-four outer terminals 152a, eight outer terminals 152a that are arranged at equal angular intervals along the circumferential direction of the insulator 143 are referred to as first outer terminals 161, which have the same shape as the outer terminals 152a of the first short-circuit component 151. Among the twenty-four outer terminals 152a, the other sixteen outer terminals 152a, each pair of which are located between each adjacent pair of the first outer terminals 161, are referred to as second outer terminals 162, which are longer in the radial direction than the first outer terminals 161. The circumferential dimension of each second outer terminal 162 is equal to the circumferential dimension of each first outer terminal 161. Each second outer terminal 162 has at its distal end a bent piece 162a, which is bent to be parallel to the axial direction before the coils M1 to M8 are wound. As shown in FIG. 15, the total thickness of the laminated outer terminals 151a, 152a is less than the projecting length of the swage projections 145a, 145b.

As shown in FIG. 17, twenty-four (that is, the same number as the segments 1 to 24) inner terminals 151b, which form the first short-circuit component 151, are arranged inside of the outer terminals 151a. The inner terminals 151b are arranged at equal angular intervals along the circumferential direction of the insulator 143. The inner terminals 151b are aligned with the outer terminals 151a in the circumferential direction. The center line of each outer terminal 151a and the inner terminal 151b intersects the insulator 143 and extends in a radial direction. The center lines of each aligned pair of the outer terminals 151a and the inner terminals 151b along the radial direction of the insulator 143 coincide with each other.

Likewise, twenty-four (that is, the same number as the segments 1 to 24) inner terminals 152b, which form the second short-circuit component 152, are arranged inside of the circumferentially arranged outer terminals 152a. The inner terminals 152b are arranged at equal angular intervals along the circumferential direction of the insulator 143. The inner terminals 152b are aligned with the outer terminals 152a in the circumferential direction. The center line of each outer terminal 152a and the inner terminal 152b intersects the insulator 143 and extends in a radial direction. The center lines of each aligned pair of the outer terminals 152a and the inner terminals 152b along the radial direction of the insulator 143 coincide with each other.

In the first short-circuit component 151, each outer terminal 151a is coupled to the corresponding one of the inner terminals 151b, which is displaced by a predetermined angle, by a coupling portion 151c that is formed along an involute curve. Likewise, in the second short-circuit component 152, each outer terminal 152a is coupled to the corresponding one of the inner terminals 152b, which is displaced by a predetermined angle, by a coupling portion 151c that is formed along an involute curve. In this embodiment, the predetermined angles are 60°, which corresponds to an angle containing four of the inner terminals 151b, 152b. The outer terminals 151a, the inner terminals 151b, and the coupling portions 151c, which form the first short-circuit component 151 are formed in a common plane. The outer terminals 152a, the inner terminals 152b, and the coupling portions 152c, which form the second short-circuit component 152 are formed in a common plane. Each coupling portion 151c is formed thinner than the outer terminals 151a and the inner terminals 151b such that a step 151d is defined between a surface of a side of the coupling portion 151c in a direction of the thickness and a surface of a side of the corresponding outer terminal 151a and inner terminal 151b as shown in FIG. 14B. Likewise, each coupling portion 152c is formed thinner than the outer terminals 152a and the inner terminals 152b such that a step 152d is defined between a surface of a side of the coupling portion 152c in a direction of the thickness and a surface of a sides of the corresponding outer terminal 152a and inner terminal 152b.

As shown in FIG. 17, the first and second short-circuit components 151, 152 are laminated in a direction of thickness such that the coupling portions 151c of the first short-circuit component 151 and the coupling portions 152c of the second short-circuit component 152 are directed in opposite directions as viewed in the axial direction of the insulator 143, such that the coupling portions 151c, 152c intersect with each other. In the laminated first and second short-circuit components 151, 152, the outer terminals 151a of the first short-circuit component 151 and the outer terminals 152a of the second short-circuit component 152 establish surface contact. Also, the inner terminals 151b of the first short-circuit component 151 and the inner terminals 152b of the second short-circuit component 152 establish surface contact. On the other hand, the coupling portions 151c of the first short-circuit component 151 and the coupling portions 152c of the second short-circuit component 152 are made thinner than the outer terminals 151a, 152a and the inner terminals 151b, 152b so that the steps 151d, 152d are formed. Therefore, the coupling portions 151c and the coupling portions 152c do not contact in the direction of lamination (in this embodiment, axial direction). The laminated outer terminals 151a, 152a are integrated by spot-welding. Also, the laminated inner terminals 151b, 152b are integrated by spot-welding.

As shown in FIG. 16, in the laminated first and second short-circuit components 151, 152, twenty-four sets of the inner terminals 151b, 152b that contact each other in the direction of lamination is integrally molded with an annular varistor 171. Specifically, the varistor 171 covers the surfaces of the inner terminals 151b, 152b except for contacting surfaces, and is interposed between and electrically connects each circumferentially adjacent pair of the inner terminals 151b, 152b. The varistor 171 normally has a higher resistance than that of the coils M1 to M8. When a certain voltage or higher is applied, the resistance of the varistor 171 is quickly reduced.

In the laminated first and second short-circuit components 151, 152, a portion that extends from a radially outer surface of the varistor 171 to a midway of the laminated outer terminals 151a, 152a is covered by an annular insulating portion 172. The insulating portion 172 is made of insulating resin material and fills the gap between each circumferentially adjacent pair of the coupling portions 151c, 152c, and the gaps between the coupling portions 151c of the first short-circuit component 151 and the coupling portions 152c of the second short-circuit component 152. As shown in FIGS. 14A and 14B, an end surface of the insulating portion 172 facing the insulator 143 is flush with an end surface of the varistor 171 facing the insulator 143. An end surface of the insulating portion 172 facing the insulator 143 and an end surface of the varistor 171 facing the insulator 143 are perpendicular to the center axis of the insulator 143 and correspond to the lower end surface of the insulator 143 in FIG. 14.

Figure 18:
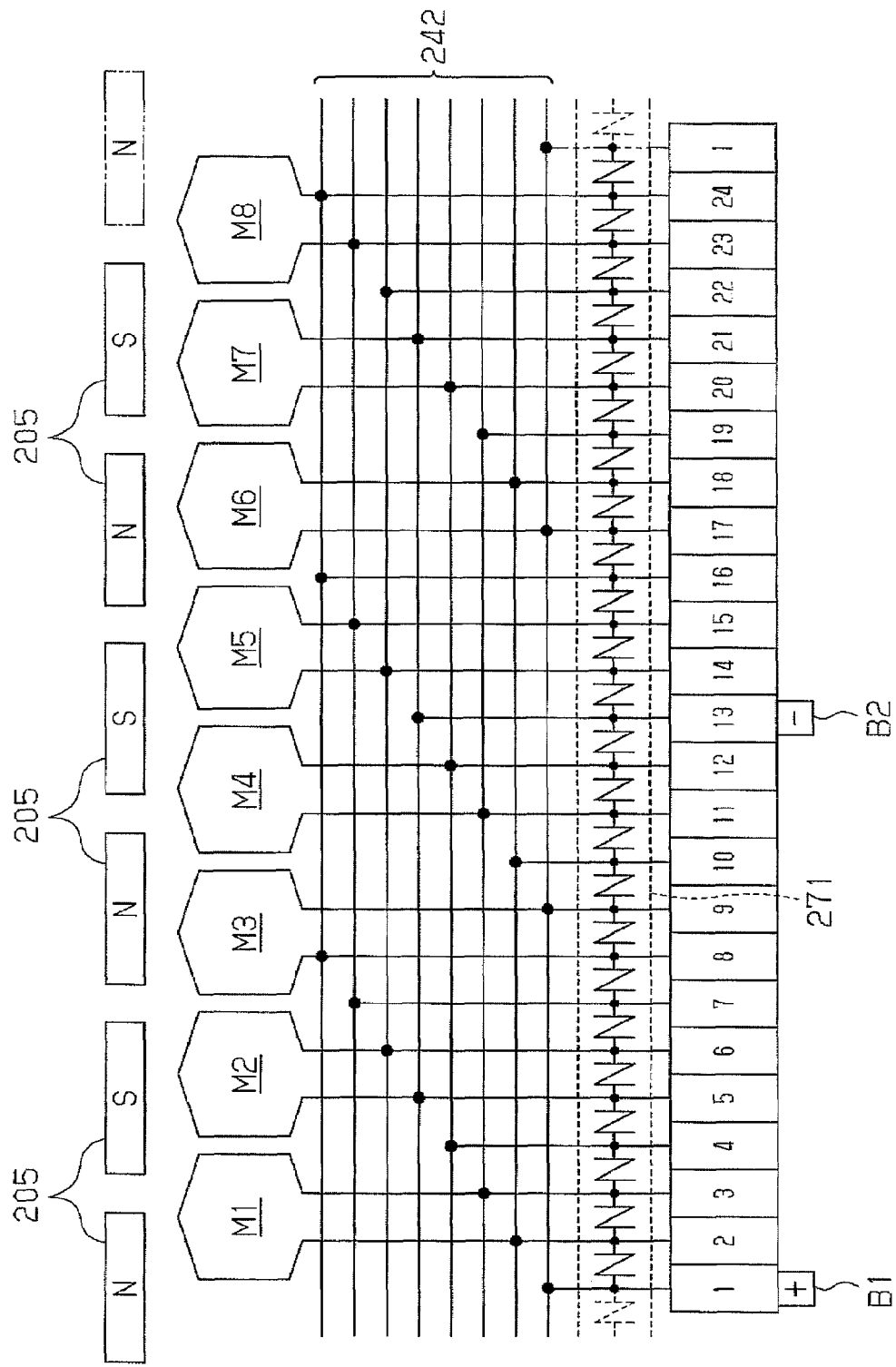
FIG. 18 is a connection diagram of the motor shown in FIG. 12.

The short-circuit member 142 is located the lower end of the commutator main body 141. The short-circuit member 142 is fixed to the commutator main body 141 by crimping the outer terminals 151a, 152a by the swage projections 145a, 145b formed on the segments 1 to 24. Since each of the outer terminals 151a, 152a is crimped by a corresponding pair of the swage projections 145a, 145b, the segments 1 to 24 are electrically connected to the short-circuit member 142, and the short-circuit member 142 short-circuits the segments 1 to 24 at the same potential. The short-circuit member 142 short-circuits three of the segments that are angularly spaced by intervals of 120°. That is, as shown in FIG. 18, the short-circuit member 142 short-circuits the segments 1, 9, 17 to one another, the segments 2, 10, 18 to one another, and the segments 3, 11, 19 to one another. Also, the short-circuit member 142 short-circuits the segments 4, 12, 20 to one another, the segments 5, 13, 21 to one another, and the segments 6, 14, 22 to one another. Further, the short-circuit member 142 short-circuits the segments 7, 15, 23 to one another, and the segments 8, 16, 24 to one another. In the short-circuit member 142 fixed to the commutator main body 141, the second outer terminals 162 extend radially outward from the outer circumferential surfaces of the segments 1 to 24 fixed to the outer circumferential surface of the insulator 143. In a state where the short-circuit member 142 is fixed to the commutator main body 141, the center axis of the varistor 171 coincides with the center axis of the insulator 143.

Since, in the first short-circuit component 151, each pair of the outer terminals 151a that are connected to a circumferentially adjacent pair of the inner terminals 151b by the corresponding coupling portions 151c are circumferentially adjacent to each other, the segments connected to these two outer terminals 151a are circumferentially adjacent to each other. Since, in the second short-circuit component 152, each pair of the outer terminals 152a that are connected to a circumferentially adjacent pair of the inner terminals 152b by the corresponding coupling portions 152c are circumferentially adjacent to each other, the segments connected to these two outer terminals 152a are circumferentially adjacent to each other. Further, the varistor 171 is electrically interposed between each circumferentially adjacent pair of the inner terminals 151b and between each circumferentially adjacent pair of the inner terminals 152b. Accordingly, when the short-circuit member 142 is fixed to the commutator main body 141, the varistor 171 is electrically interposed between any one of circumferentially adjacent pairs of the segments 1 to 24 via the first and second short-circuit components 151, 152.

In the commutator C1 described above, each second outer terminal 162 is connected to corresponding one of the ends of the coils M1 to M8. More specifically, two of the second outer terminals 162 that correspond to one of eight adjacent pairs of segments along the circumferential direction of the commutator C1, or the segments 2 and 3, the segments 5 and 6, the segments 8 and 9, the segments 11 and 12, the segments 14 and 15, the segments 17 and 18, the segments 20 and 21, and the segments 23 and 24, are each connected to one of the ends of the corresponding one of the coils M1 to M8. For example, two of the second outer terminals 162 that correspond to the segments 2 and 3 are each connected to one of the ends of the coil M1, so that the ends of the coil M1 are electrically connected to the segments 2 and 3. After the coils M1 to M8 are wound about the teeth T1 to T8, the ends of the coil M1 to M8 are tightly held by the second outer terminals 162 by folding the bent pieces 162a toward the radial center of the commutator C1, and connected to the second outer terminals 162, for example, by fusing.

In the motor 201 constructed as above according to the present embodiment, when an electric current is selectively supplied to the coils M1 to MB from the external power supply through the anode brush B1 and the cathode brush B2, the coils M1 to M8 generate a rotating magnetic field, and the armature 203 is rotated. When the armature 203 rotates, the commutator C1 is rotated, accordingly. Then, the anode brush B1 and the cathode brush B2, which slide on the segments 1 to 24 of the commutator C1, consecutively rectify the coils M1 to M8. At this time, when there is a sign of a high voltage between a brush and two segments to which the ends of a coil that is being rectified are connected, the resistance of the varistor 171, which electrically interposed between the two segments, is reduced so that spark discharge generated between the commutator C1 and the brushes is decreased, and the current flows through the varistor 171. This lowers the voltage between the brush and the two segments to which the ends of the coil that is being rectified are connected, which suppresses spark discharge. When the voltage between the brush and the two segments to which the ends of the coil that is being rectified are connected is lowered, the resistance of the varistor 171 is returned to a value higher than the resistance of the coil.

A method for manufacturing the commutator C1 according to the present embodiment will now be described.

First, a punching process for forming the first and second short-circuit components 151, 152 is performed. In the punching process, the first and second short-circuit components 151, 152 are formed by punching conductive plates (for example, copper plates) with punches (not shown). When punching the outer terminals 151a, the inner terminals 151b, and the coupling portions 151c, the coupling portions 151c are formed to be thin so that the steps 151d are formed. When punching the outer terminals 152a, the inner terminals 152b, and the coupling portions 152c, the coupling portions 152c are formed to be thin so that the steps 152d are formed.

Next, a laminating process for laminating the first and second short-circuit components 151, 152, which have been formed by punching, is performed. In the laminating process, the first and second short-circuit components 151, 152 are laminated such that the coupling portions 151c of the first short-circuit component 151 and the coupling portions 152c of the second short-circuit component 152 are directed in opposite directions as viewed in the direction of thickness. The corresponding ones of the outer terminals 151a, 152a and the corresponding ones of the inner terminals 151b, 152b are caused to contact each other. At this time, since the steps 151d, 152d have been formed in the first and second short-circuit components 151, 152, the coupling portions 151c, 152c do not contact in the direction of lamination, and a gap is defined between each facing pairs of the coupling portions 151c, 152c in the direction of lamination. Thereafter, contacting pairs of the outer terminals 151a, 152a and the contacting pairs of the inner terminals 151b, 152b are integrated by spot-welding, so that the first short-circuit component 151 and the second short-circuit component 152 are integrated as shown in FIG. 17.

Figure 19:
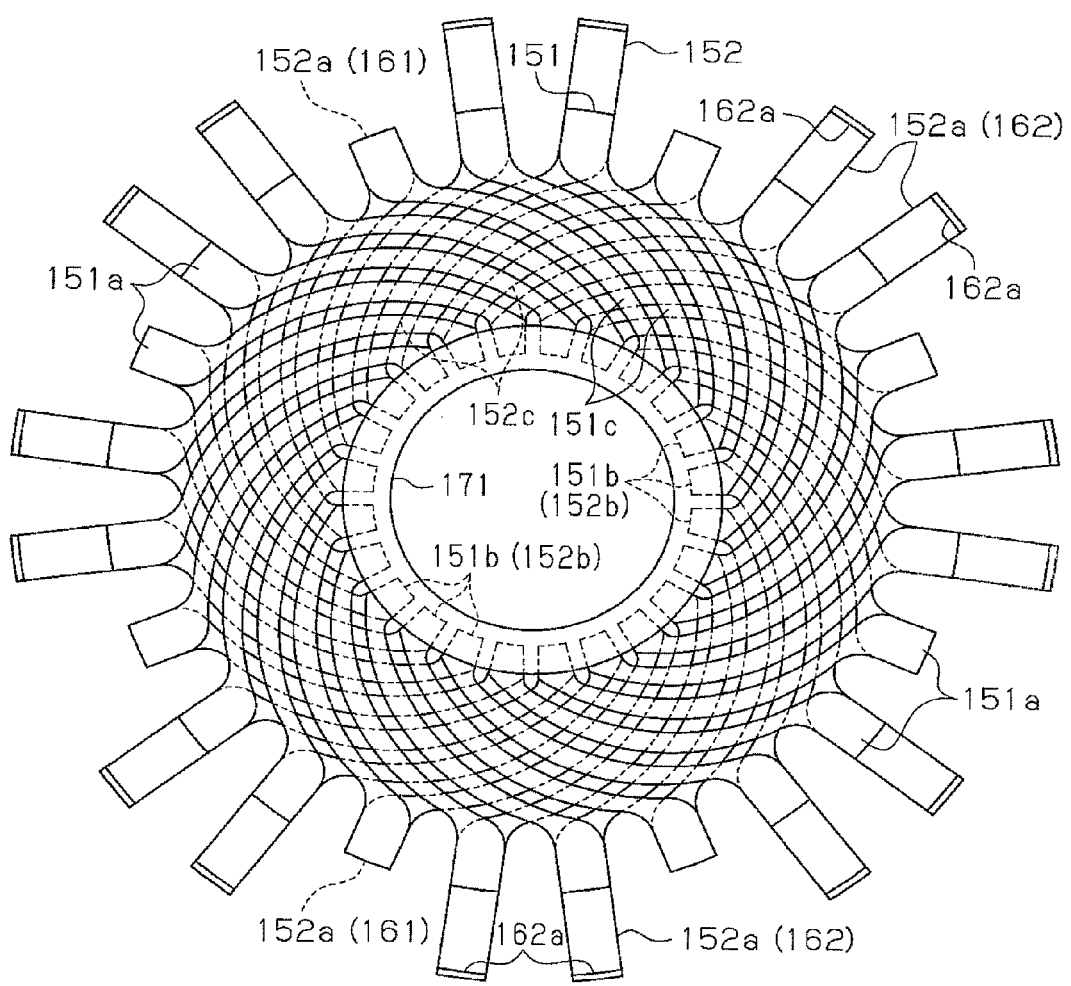
FIG. 19 is a plan view of a short-circuit component of the motor shown in FIG. 12, with which a varistor is integrally molded.

Then, a varistor molding process (surge absorbing element molding process) for forming the varistor 171 by sintering is performed. In the varistor molding process, the integrated first and second short-circuit components 151, 152 are placed in a mold (not shown), and the mold is filled with powder material to be formed into the varistor 171 (for example, powder of strontium titanate). The powder material filling the mold covers the inner terminals 151b, 152b except for the contacting surfaces and is formed to be annular so as to be interposed between circumferentially adjacent pairs of the inner terminals 151b, 152b. The powder material is then pressed and subject to thermal treatment at a temperature that is equal to or less than the melting point of the powder material. This hardens the powder material so that the annular varistor 171 is integrally molded with the inner terminals 151b, 152b as shown in FIG. 19. The formed varistor 171 electrically connects each circumferentially adjacent pair of the inner terminals 151b, 152b.

Subsequently, an insulating portion molding process for forming the insulating portion 172 is performed. In the insulating portion molding process, the first and second short-circuit components 151, 152, in which the varistor 171 has been formed, is placed in a mold for forming the insulating portion 172. Then, the mold is filled with molten insulating resin material. At this time, the molten insulating resin material covers portions of the first and second short-circuit components 151, 152 that extends from a radially outer surface of the varistor 171 to a midway of the laminated outer terminals 151a, 152a. At the same time, the molten resin material fills the gap between each circumferentially adjacent pair of the coupling portions 151c, 152c, and the gaps between the coupling portions 151c of the first short-circuit component 151 and the coupling portions 152c of the second short-circuit component 152. The insulating resin material is then cooled and hardened to form the insulating portion 172, which completes the short-circuit member 142. After the insulating portion 172 is formed, the short-circuit member 142 is removed from the mold.

Subsequently, an assembling process for assembling the short-circuit member 142 with the commutator main body 141 is performed. In the assembling process, the short-circuit member 142 is arranged at the lower end of the commutator main body 141, and each of the outer terminals 151a, 152a is arranged between the corresponding pair of the swage projections 145a, 145b that are formed at the lower end of the segments 1 to 24. Each pair of the swage projections 145a, 145b is crimped to approach each other in the circumferential direction, so that the outer terminals 151a, 152a are connected to the segments 1 to 24. This fixes the short-circuit member 142 to the commutator main body 141, and thus completes the commutator C1.

As described above, the present embodiment has the following advantages.

(1) The varistor 171 is integrally molded with the inner terminals 151b, 152b in the laminated first and second short-circuit components 151, 152 so as to be interposed between each circumferentially adjacent pair of the inner terminals 151b, 152b. In this manner, the varistor 171 is built in the commutator C1 by a simple structure, or by being integrally molded with the inner terminals 151b, 152b.

The varistor 171 is integrally molded with the inner terminals 151b, 152b through the varistor molding process, in which powder material for the varistor 171 is provided between each circumferentially adjacent pair of the inner terminals 151b, 152b, and the powder material is pressed is hardened through thermal treatment. In this manner, the varistor 171 is integrally molded with the inner terminals 151b, 152b through a simple method in which powder material is pressed and subjected to thermal treatment.

Therefore, since the varistor 171 is formed in the commutator C1 without using contact pieces like the prior art, the procedure for forming the varistor 171 is not complicated even in the case of the multipolar motor 201, which has more poles than motors with two permanent magnets and three coils. As a result, the varistor 171 is easily built in the commutator C1.

(2) Since the varistor 171 is integrally molded with the inner terminals 151b, 152b, the segments 1 to 24 do not need to have projections such as the prior art contact pieces for attaching the varistor 171 to the commutator C1. This prevents the segments 1 to 24 from having completed shapes, and thus reduces the manufacturing costs of the commutator C1.

(3) In a state where the short-circuit member 142 is fixed to the commutator main body 141, the center axis of the varistor 171 coincides with the center axis of the insulator 143. The weight balance of the commutator C1, which rotates in the circumferential direction, is well balanced. Since the varistor 171 is formed to be annular, the shapes of the laminated first and second short-circuit components 151, 152 are stable. Therefore, when filling the gaps between the facing coupling portions 151c, 152c in the direction of lamination with molten insulating resin material in the insulation portion molding process performed after the varistor molding process, the coupling portions 151c, 152c are prevented from being deformed or displaced by the molten resin material. Therefore, filling of the resin material is facilitated. Also, in the insulating portion molding process, the coupling portions 151c, 152c are prevented from contacting each other and being short-circuited. Further, since the shapes of the laminated first and second short-circuit components 151, 152 are stable, the short-circuit member 142 can be readily assembled with the commutator main body 141.

(4) The varistor 171 is integrally molded with the inner terminals 151b, 152b in the laminated first and second short-circuit components 151, 152 so as to be interposed between each circumferentially adjacent pair of the inner terminals 151b, 152b. Therefore, in the laminated first and second short-circuit components 151, 152, the volume of the varistor 171 is less than that in the case where a varistor integrally molded annularly with the outer terminals 151a, 152a. As a result, compared to the case in which a varistor is integrally molded with the outer terminals 151a, 152a, the amount of powder material is reduced. This reduces the manufacturing costs.

(5) The insulating portion 172 is formed to fill the gaps between the coupling portions 151c, 152c facing each other in the direction of lamination. This ensures the non-contact state of the coupling portions 151c, 152c facing each other in the direction of lamination. Thus, the coupling portions 151c, 152c are prevented from being short-circuited to each other. An end surface of the insulating portion 172 that faces the insulator 143 is formed to be flush with an end surface of the varistor 171 that faces the insulator 143, and an end surface of the insulating portion 172 that faces the insulator 143 and an end surface of the varistor 171 that faces the insulator 143 are formed to be perpendicular to the center axis of the insulator 143 and correspond to the lower end surface of the insulator 143 as viewed in FIG. 14. Therefore, in the assembling process, the surfaces of the varistor 171 and the insulating portion 172 that face the insulator 143 contact the lower end surface of the insulator 143, so that the short-circuit member 142 is stably arranged at the lower end of the commutator main body 141. As a result, the short-circuit member 142 is easily assembled to the commutator main body 141.

The fourth embodiment may be modified as follows.

Figure 20A:
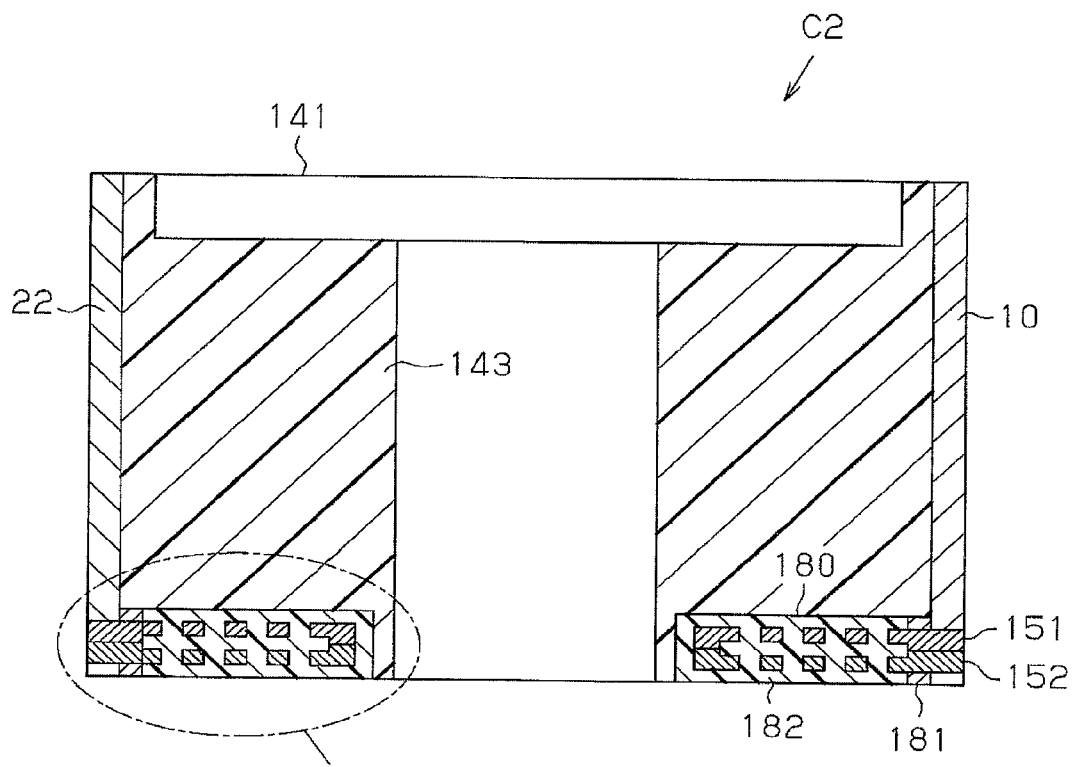
FIG. 20A is an axial cross-sectional view of a commutator according to another embodiment of the present invention.
Figure 20B:
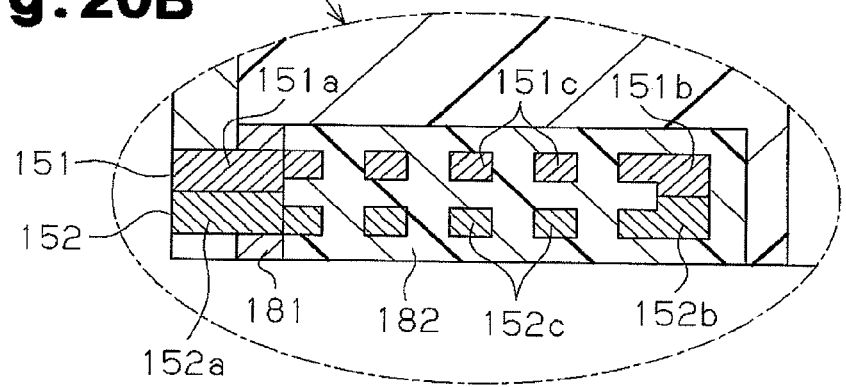
FIG. 20B is a partially enlarged view of FIG. 20A.
Figure 21:
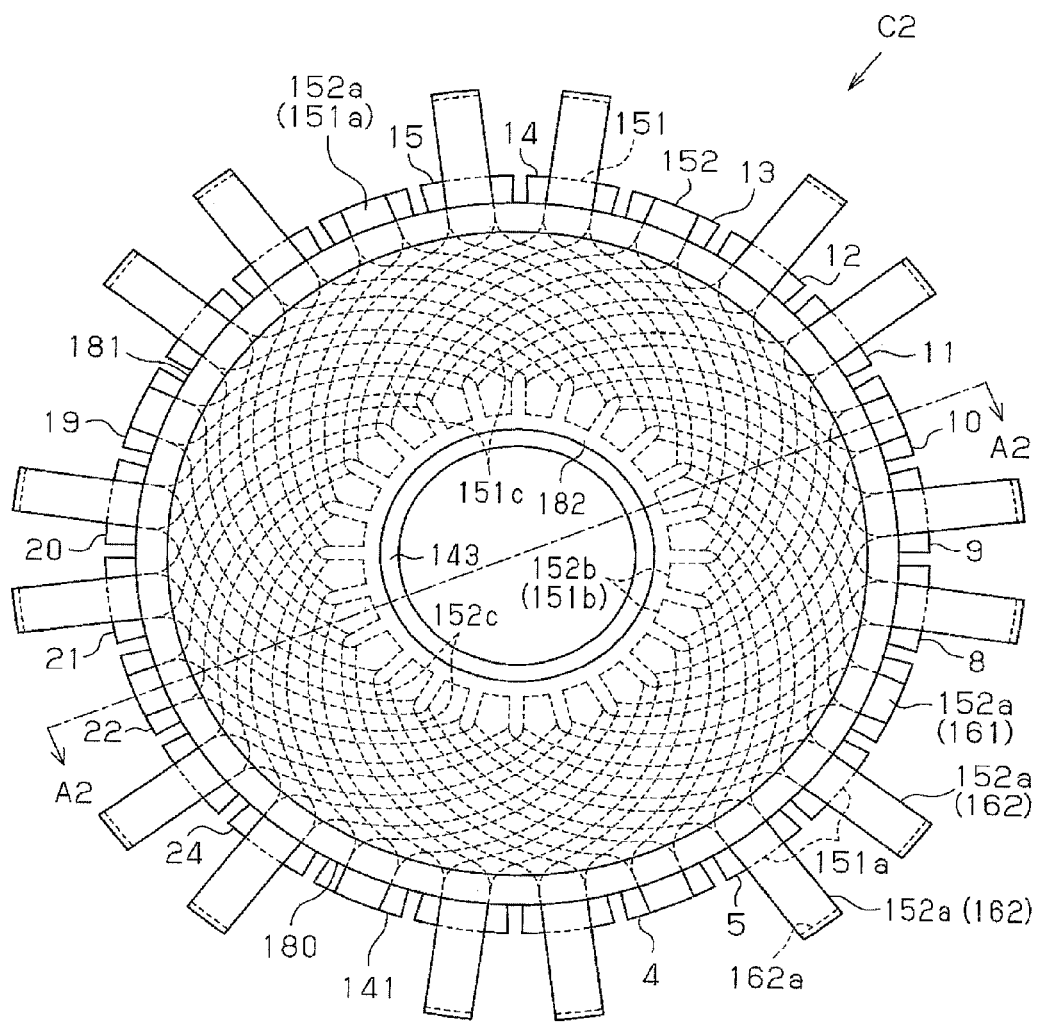
FIG. 21 is a bottom view of the commutator shown in FIG. 20A.

The varistor 171 of the fourth embodiment may be replaced by a varistor 181 shown in FIGS. 20A, 20B, and 21. In FIGS. 20A, 20B, and 21, the same reference numerals are given to those components that are the same as the corresponding components in the fourth embodiment. The varistor 181, which is built in a short-circuit member 180 shown in FIGS. 20A and 21, is integrally molded with the twenty-four sets of the outer terminals 151a, 152a that contact each other in the direction of lamination. The varistor 181 is annular and covers the surfaces of the outer terminals 151a, 152a except for contacting surfaces. The varistor 181 is interposed between and electrically connects each circumferentially adjacent pair of the outer terminals 151a, 152a. In the short-circuit member 180, an insulating portion 182, which is made of insulating resin material, is annular and covers the inner terminals 151b, 152b from the radially inner surface of the varistor 181. As shown in FIG. 20B, the insulating portion 182, like the insulating portion 172 of the fourth embodiment, fills the gap between each circumferentially adjacent pair of the coupling portions 151c, 152c, and the gaps between the coupling portions 151c of the first short-circuit component 151 and the coupling portions 152c of the second short-circuit component 152. The commutator C2, which has the short-circuit member 180 as described above, is manufactured through the manufacturing method of the fourth embodiment like the commutator C1. This configuration has the same advantages as the items (1) to (3) of the advantages of the fourth embodiment. The short-circuit member 142 of the fourth embodiment may have the varistor 181 in addition to the varistor 171.

In the fourth embodiment, the annular varistor 171 is integrally molded with all the twenty-four sets of the inner terminals 151b, 152b. However, the varistor 171 may be integrally molded only with selected ones of the inner terminals 151b, 152b out of the twenty-four sets of the inner terminals 151b, 152b as long as the varistor 171 is electrically interposed between any circumferentially adjacent pair of the segments 1 to 24 via the short-circuit member 142. For example, in the motor 201, a varistor may be integrally molded with circumferentially consecutive five sets of the inner terminals 151b, 152b, and another varistor may be integrally molded with circumferentially consecutive five sets of the inner terminals 151b, 152b that are symmetric to the first five sets with respect to a point on the center axis of the insulator 143. In the motor 201, a varistor may be integrally molded only with a set of nine circumferentially consecutive set of the inner terminals 151b, 152b. The same modification can be applied to the case in which the outer terminals 151a, 152a are integrated as shown in FIGS. 20A and 21. This configuration reduces the volume of the varistor, and thus reduces the manufacturing costs.

In the fourth embodiment, the varistor 171 is annular. However, the shape of the varistor 171 is not limited to this. For example, the varistor 171 may have a polygonal shape when viewed in the axial direction.

The insulating portion 172 may be omitted from the short-circuit member 142. The insulating portion 172 may be provided only between the facing pairs of the coupling portions 151c, 152c.

In the thermal treatment of the varistor molding process, the temperature may be controlled such that the surfaces of the inner terminals 151b, 152b except for the contacting surfaces are welded to the varistor 171. This improves the reliability of the electrical connection between the inner terminals 151b, 152b and the varistor 171.

In the fourth embodiment, the varistor molding process is performed subsequently to the laminating process. However, a plating process may be performed between the laminating process and the varistor molding process. In the plating process, the surfaces of the first and second short-circuit components 151, 152 to which the varistor 171 is integrally molded (the inner terminals 151b, 152b) are plated with a brazing filler metal. Since the brazing filler metal permits the surfaces of the varistor 171 and the inner terminals 151b, 152b to be reliably contact each other, the reliability of the electrical connection between the inner terminals 151b, 152b and the varistor 171 is improved.

In the fourth embodiment, each of the coupling portions 151c, 152c is formed along an involute curve. However, the coupling portions 151c, 152c may be arcuate or linear. Also, in the fourth embodiment, the outer terminals 151a, 152a and the inner terminals 151b, 152b are each substantially rectangular. However, the terminals 151a, 152a, 151b, 152b may be circular.

In the fourth embodiment, the ends of the coils M1 to M8 are connected to the second outer terminals 162. However, a configuration may be applied in which the first outer terminals 161 have the same shape as the second outer terminals 162 of the fourth embodiment, the second outer terminals 162 have the same shape as the first outer terminals of the fourth embodiment, and each first outer terminal 161 is connected to the ends of the corresponding one of the coils M1 to M8. In this case, the ends of two coils are connected to each first outer terminal 161.

In the fourth embodiment, the varistor 171 is used as a surge absorbing element for reducing spark discharge generated among the segments 1 to 24, the anode brush B1, and the cathode brush B2. However, a surge absorbing element other than the varistor manufactured by the manufacturing method of the fourth embodiment may be used.

In the fourth embodiment, the motor 201 has six permanent magnets 205, eight coils M1 to M8, and twenty-four segments 1 to 24. However, the numbers of permanent magnets, coils, and segments are not limited to these, but may be changed as necessary.

The invention claimed is:

1. A commutator connected to a plurality of armature coils, comprising:

circumferentially arranged segments, the number of the segments being a multiple of the number of the armature coils, wherein the segments include a plurality of pairs of segments, the segments in each pair being adjacent to each other in the circumferential direction, wherein each segment in each pair is connected to one of the ends of corresponding one of the armature coils;

short-circuit conductors, the number of which is the same as the number of the armature coils, each short-circuit conductor short-circuiting segments that are at the same potential to each other; and a surge absorbing element, the resistance of the surge absorbing element varying so as to reduce spark discharge generated between the segments and an electricity supply brush sliding on the segments, wherein each short-circuit conductor is connected, either directly or via corresponding one of the segments, to the surge absorbing element, so that the surge absorbing element is electrically interposed between the ends of each armature coil.

2. The commutator according to claim 1, wherein the surge absorbing element includes a plurality of connection electrodes, the connection electrodes are connected either to a circumferentially consecutive set of the segments, the number of which in this set is less than twice the number of the short circuit conductors, or to the short circuit conductors connected to the segments in the set, and wherein the other segments are connected to the surge absorbing element via the corresponding short-circuit conductors.

3. The commutator according to claim 2, wherein the number of the segments is twenty-four, and each short-circuit conductor short-circuits three of the segments, each pair of the three segments being separated with seven other segments in between, and wherein the surge absorbing element is one of nine surge absorbing elements.

4. The commutator according to claim 1, further comprising a cylindrical insulator, the segments being fixed to the outer circumferential surface of the insulator, wherein the surge absorbing element is one of a plurality of surge absorbing elements that are symmetric with respect to a point on a center axis of the insulator as viewed in the axial direction of the insulator.

5. The commutator according to claim 4, wherein the number of the segments is twenty-four, and each short-circuit conductor short-circuits three of the segments, each pair of the three segments being separated with seven other segments in between, wherein the number of the surge absorbing elements is two, each surge absorbing element having five connection electrodes, the connection electrodes being connected either to a circumferentially consecutive set of the segments, or to the short-circuit conductors connected to the segments in the set.

6. The commutator according to claim 1, further comprising a short-circuit member forming the short-circuit conductors, the short-circuit member including two short-circuit components, each short-circuit component having a set of outer terminals, a set of inner terminals, and a set of coupling portions formed in the same plane, wherein the numbers of the outer terminals, the inner terminals, and the coupling portions of each short-circuit component are each equal to the number of the segments, wherein the set of the outer terminals and the set of the inner terminals of each short-circuit component are concentrically arranged, wherein each outer terminal of each short-circuit component is coupled to one of the inner terminals that is displaced by a predetermined angular interval of the same short-circuit component via corresponding one of the coupling portions of the same short-circuit component, wherein the short-circuit components are laminated such that the coupling portions of one short-circuit component and the coupling portions of the other short-circuit component extend in an intersecting manner, such that the sets of the outer terminals of the two short-circuit components establish surface contact with each other, and the sets of the inner terminals of the two short-circuit components establish surface contact with each other, while the sets of the coupling portions of the two short-circuit components do not contact each other, and
wherein the surge absorbing element includes connection electrodes, the number of which is equal to the number of the short-circuit conductors and an even number, wherein half of the connection electrodes are connected to outer terminals that are spaced by equal angular intervals, and the other connection electrodes are connected to inner terminals that are spaced by equal angular intervals.

7. The commutator according to claim 6, wherein the number of the segments is twenty-four, and each short-circuit conductor short-circuits three of the segments, each pair of the three segments being separated with seven other segments in between, and wherein the number of the connection electrode is eight.

8. A motor comprising:
a stator having a plurality of circumferentially arranged permanent magnets;
an electricity supply brush for supplying electricity; and
an armature rotatably arranged inside of the stator, the armature including a plurality of armature coils and a commutator,
wherein the commutator includes:
circumferentially arranged segments, the number of the segments being a multiple of the number of the armature coils, wherein the segments include a plurality of pairs of segments, the segments in each pair being adjacent to each other in the circumferential direction, wherein each segment in each pair is connected to one of the ends of corresponding one of the armature coils;
short-circuit conductors, the number of which is the same as the number of the armature coils, each short-circuit conductor short-circuiting segments that are at the same potential to each other; and
a surge absorbing element, the resistance of the surge absorbing element varying so as to reduce spark discharge generated between the segments and the electricity supply brush, wherein each short-circuit conductor is connected, either directly or via corresponding one of the segments, to the surge absorbing element, so that the surge absorbing element is electrically interposed between the ends of each armature coil.

9. The motor according to claim 8, wherein, when the number of the poles of the permanent magnets and the number of the armature coils are represented by signs P and C, respectively,
the number of the segment is represented by $(P \times C)/2$,
wherein each short-circuit conductor short-circuits segments the number of which is represented by $P/2$, the short-circuited segments being spaced by an angle of $360°/(P/2)$, and
wherein the surge absorbing element is one of a plurality of surge absorbing elements the number of which is represented by n and is a positive divisor of C other than one, wherein each surge absorbing element includes connection electrodes the number of which is represented by $(C/n)+1$, the connection electrodes being connected either to a circumferentially consecutive set of the segments, or to the short-circuit conductors connected to the segments in the set.

10. The motor according to claim 9, wherein the commutator further includes a cylindrical insulator, the segments being fixed to the outer circumferential surface of the insulator, and wherein the surge absorbing elements are symmetric with respect to a point on a center axis of the insulator as viewed in the axial direction of the insulator.

11. The motor according to claim 8, wherein, when the number of the poles of the permanent magnets and the number of the armature coils are represented by signs P and C, respectively,
the number of the segment is represented by $(P \times C)/2$,
wherein each short-circuit conductor short-circuits segments the number of which is represented by $P/2$, the short-circuited segments being spaced by an angle of $360°/(P/2)$, and
wherein the surge absorbing element includes connection electrodes the number of which is represented by $C+1$, the connection electrodes being connected either to a circumferentially consecutive set of the segments, or to the short-circuit conductors connected to the segments in the set.

12. The motor according to claim 8, wherein the commutator further includes a short-circuit member forming the short-circuit conductors, the short-circuit member including two short-circuit components, each short-circuit component having a set of outer terminals, a set of inner terminals, and a set of coupling portions formed in the same plane, wherein the numbers of the outer terminals, the inner terminals, and the coupling portions of each short-circuit component are each equal to the number of the segments, wherein the set of the outer terminals and the set of the inner terminals of each short-circuit component are concentrically arranged, wherein each outer terminal of each short-circuit component is coupled to one of the inner terminals that is displaced by a predetermined angular interval of the same short-circuit component via corresponding one of the coupling portions of the same short-circuit component, wherein the short-circuit components are laminated such that the coupling portions of one short-circuit component and the coupling portions of the other short-circuit component extend in an intersecting manner, such that the sets of the outer terminals of the two short-circuit components establish surface contact with each other, and the sets of the inner terminals of the two short-circuit components establish surface contact with each other, while the sets of the coupling portions of the two short-circuit components do not contact each other, and wherein the surge absorbing element includes connection electrodes, the number of which is equal to the number of the short-circuit conductors and an even number, wherein half of the connection electrodes are connected to outer terminals that are spaced by equal angular intervals, and the other connection electrodes are connected to inner terminals that are spaced by equal angular intervals.

* * * * *